United States Patent [19]

Harmon, Jr.

[11] Patent Number: 4,655,279

[45] Date of Patent: * Apr. 7, 1987

[54] TEMPERATURE CONTROL SYSTEM WITH PROGRAMMED DEAD-BAND RAMP AND DRIFT FEATURES

[76] Inventor: Kermit S. Harmon, Jr., 12103 Sea Shore Dr., Houston, Tex. 77072

[*] Notice: The portion of the term of this patent subsequent to Dec. 10, 2002 has been disclaimed.

[21] Appl. No.: 787,751

[22] Filed: Oct. 15, 1985

Related U.S. Application Data

[60] Division of Ser. No. 539,371, Oct. 5, 1983, Pat. No. 4,557,317, and a continuation-in-part of Ser. No. 236,177, Feb. 20, 1981, abandoned.

[51] Int. Cl.$^4$ ............................................. F25B 13/00
[52] U.S. Cl. ............................................. 165/2; 165/12
[58] Field of Search ................ 165/12, 2; 62/157; 236/46 R; 364/557

[56] References Cited

U.S. PATENT DOCUMENTS

| | | | |
|---|---|---|---|
| 3,913,344 | 10/1975 | Holloway et al. | 165/21 |
| 3,979,059 | 9/1976 | Davis et al. | 236/46 |
| 4,136,732 | 1/1979 | Demaray et al. | 126/16 |
| 4,156,502 | 5/1979 | Day | 236/46 |
| 4,200,910 | 4/1980 | Hall | 236/46 R |
| 4,206,872 | 6/1980 | Levine | 236/46 |
| 4,228,511 | 10/1980 | Simcoe et al. | 364/506 |
| 4,410,132 | 10/1983 | Levine | 236/11 |

OTHER PUBLICATIONS

"Advanced Control Strategies for Energy Conservation in Building Operation", by Kermit S. Harmon, Jr.; published Jul. 1981.

"Load Shed Versus Comfort: The Utility Dichotomy", by Dr. Bruce Colburn and Kermit S. Harmon, Jr.; published Apr. 1983.

*Primary Examiner*—William F. Wayner
*Attorney, Agent, or Firm*—Norvell & Associates

[57] ABSTRACT

Energy saving temperature and humidity sensing and control processes, system and apparatuses operate effectively in response to signals received from occupants and to dynamic responses of building and its heating, ventilating and air conditioning system. The disclosed processes, apparatuses and system utilize thermostats equipped with a drift ramping and hold time to save energy; the thermostats only need resetting to a neutral comfort set point which is accomplished by means of a push button or touch plate. The disclosed systems are pre-programmed and set so that occupants will be comfortable although the temperature within the building drifts because the rate of drift is controlled to a gradual and normally unnoticed change.

20 Claims, 44 Drawing Figures

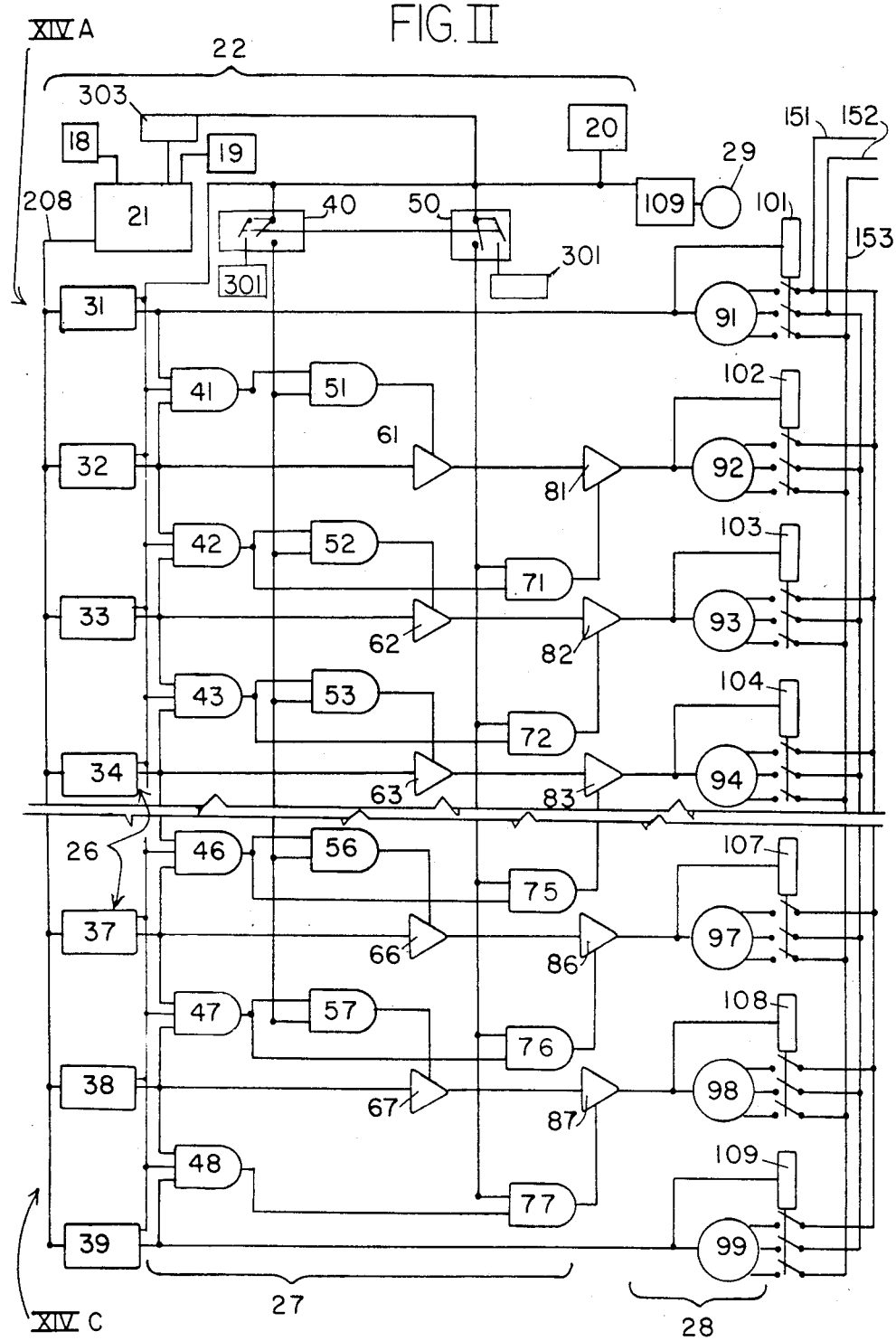
FIG. II

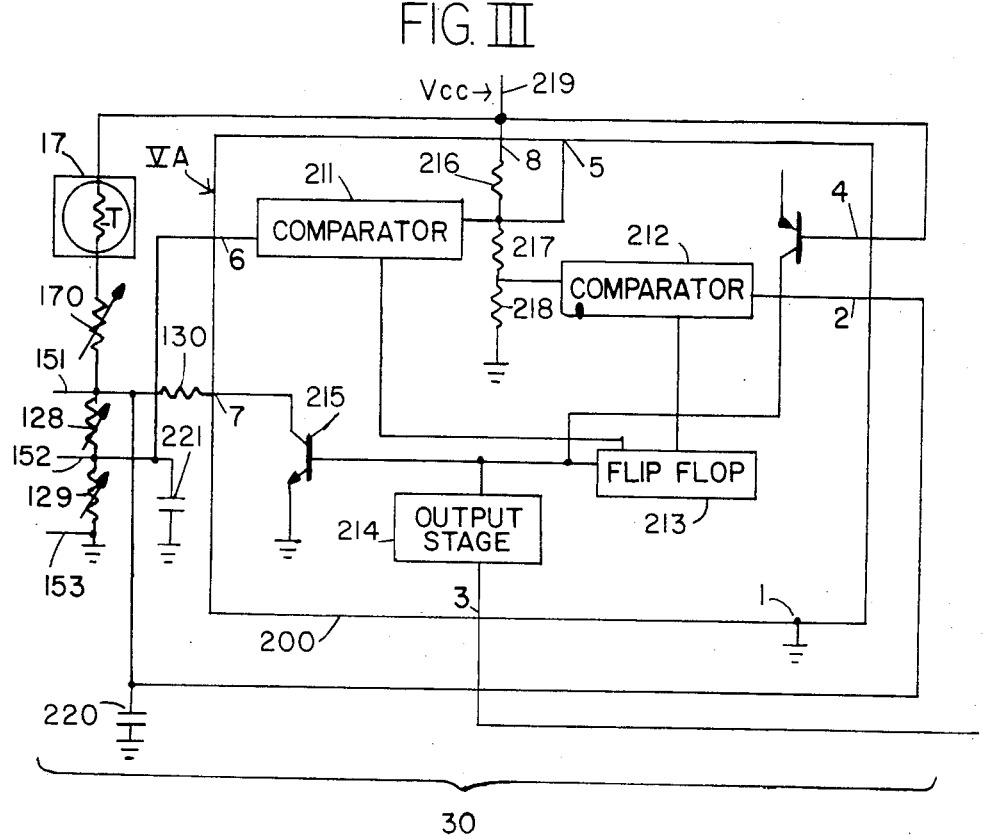
FIG. III
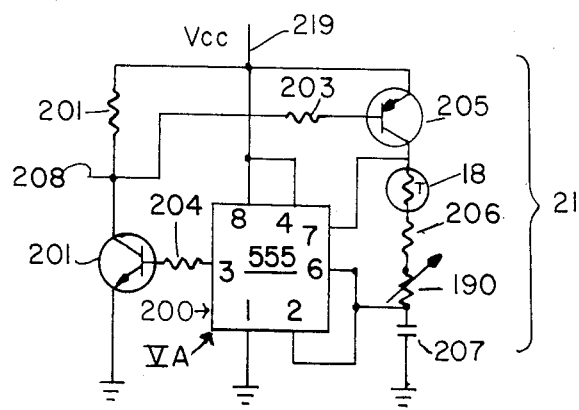
FIG. IV

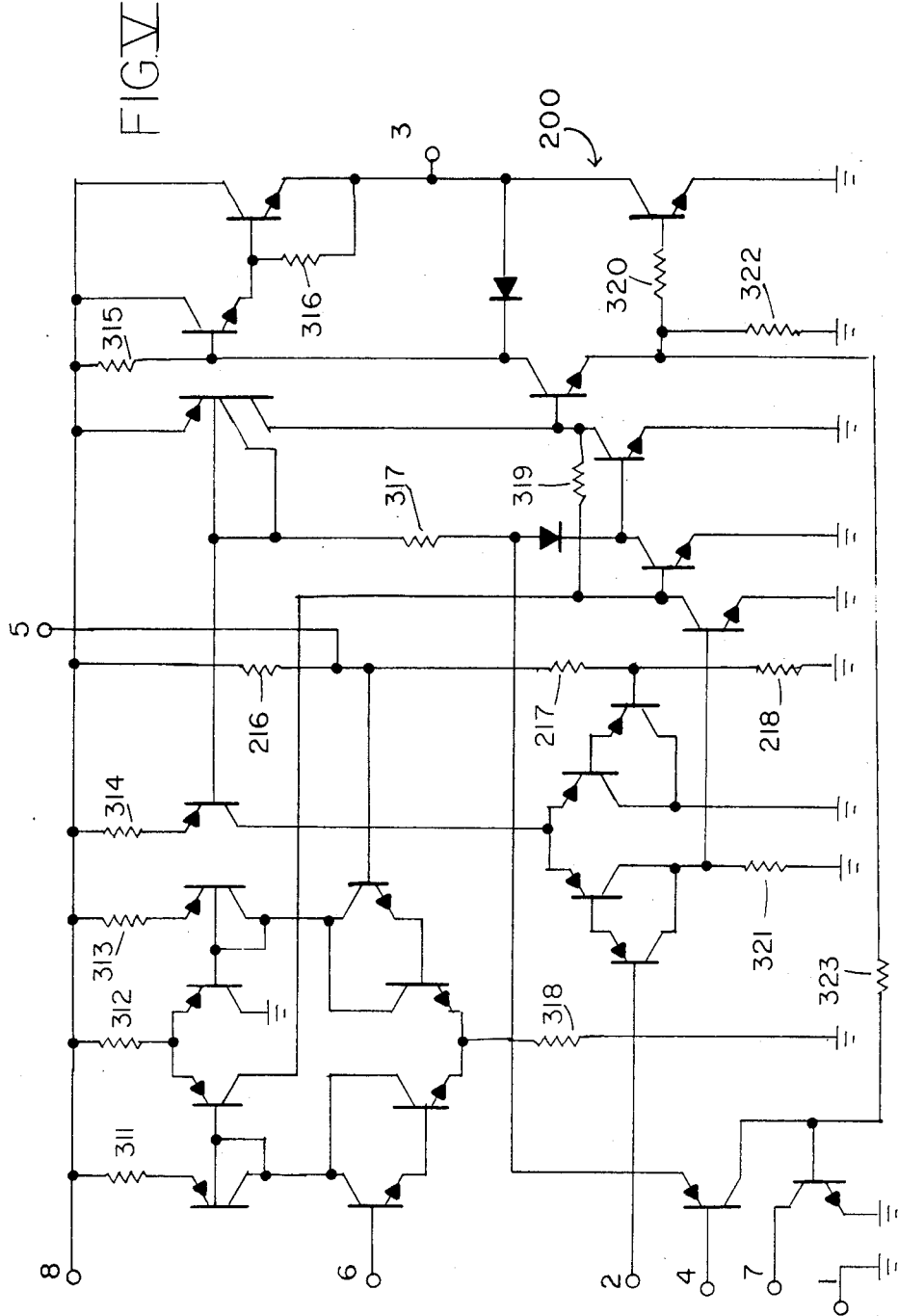
FIG V

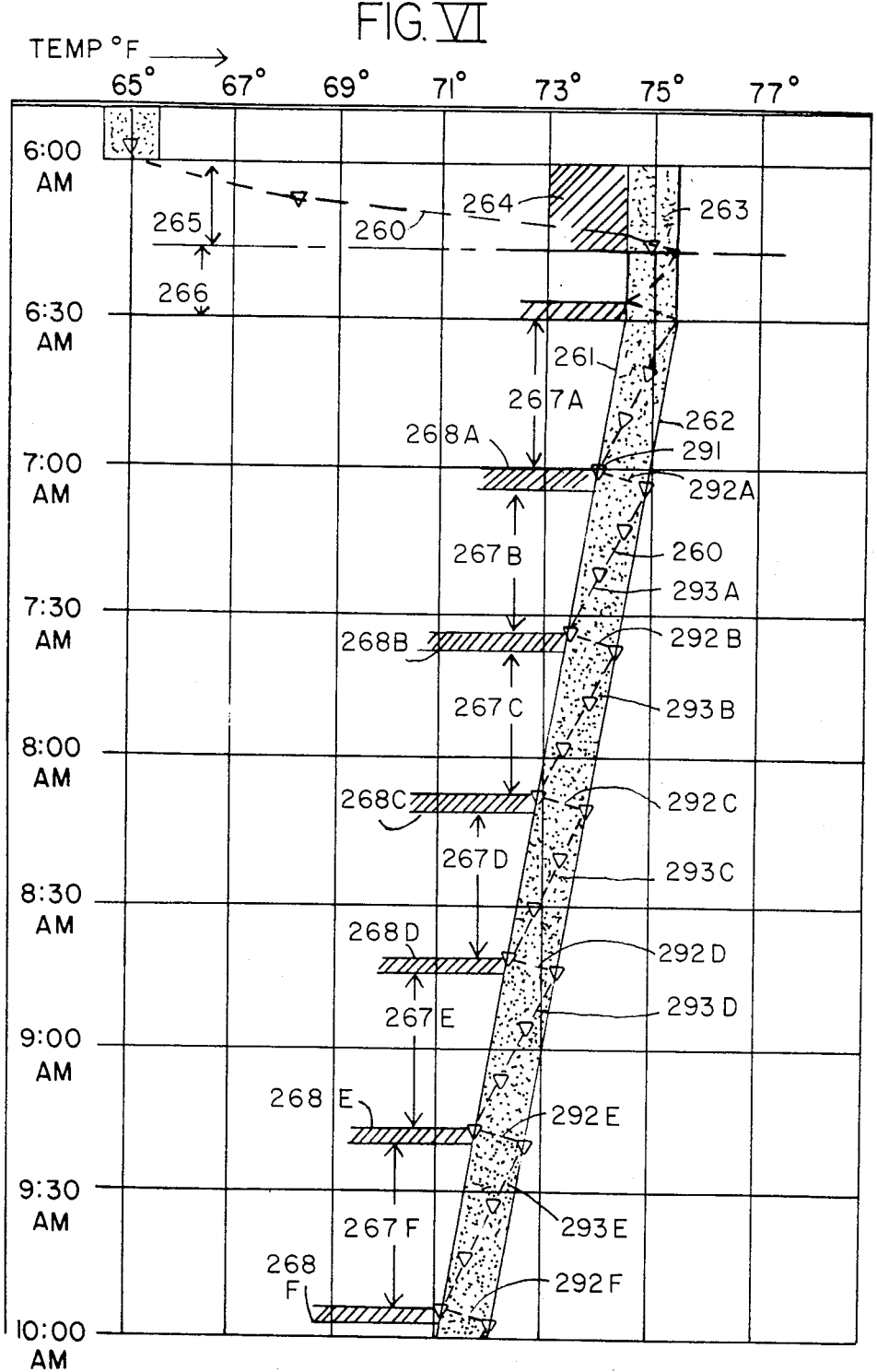
FIG. VI

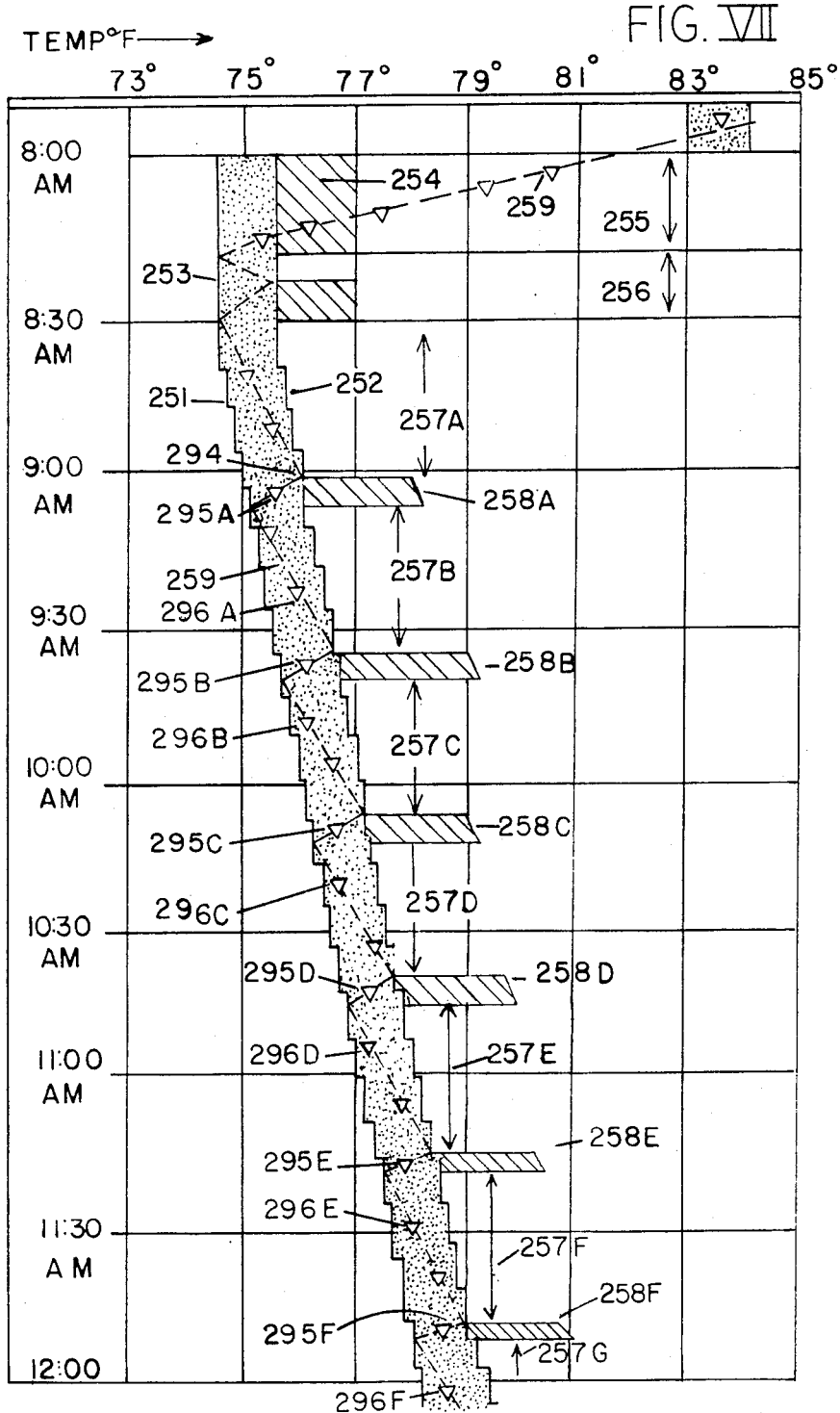

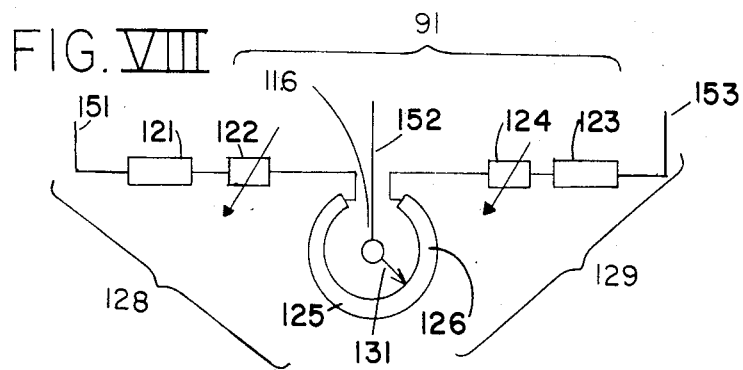
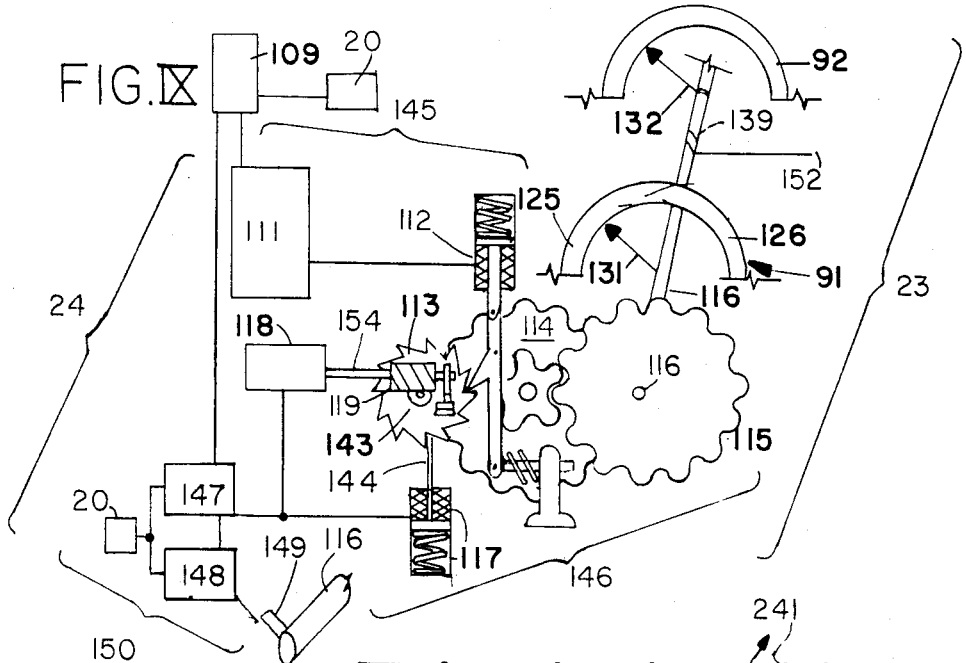
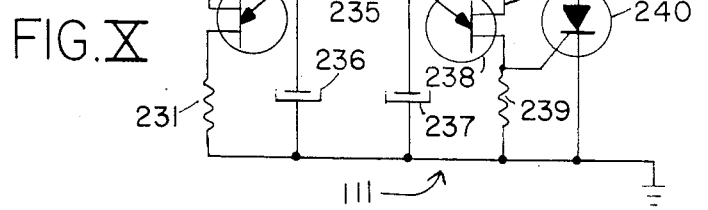

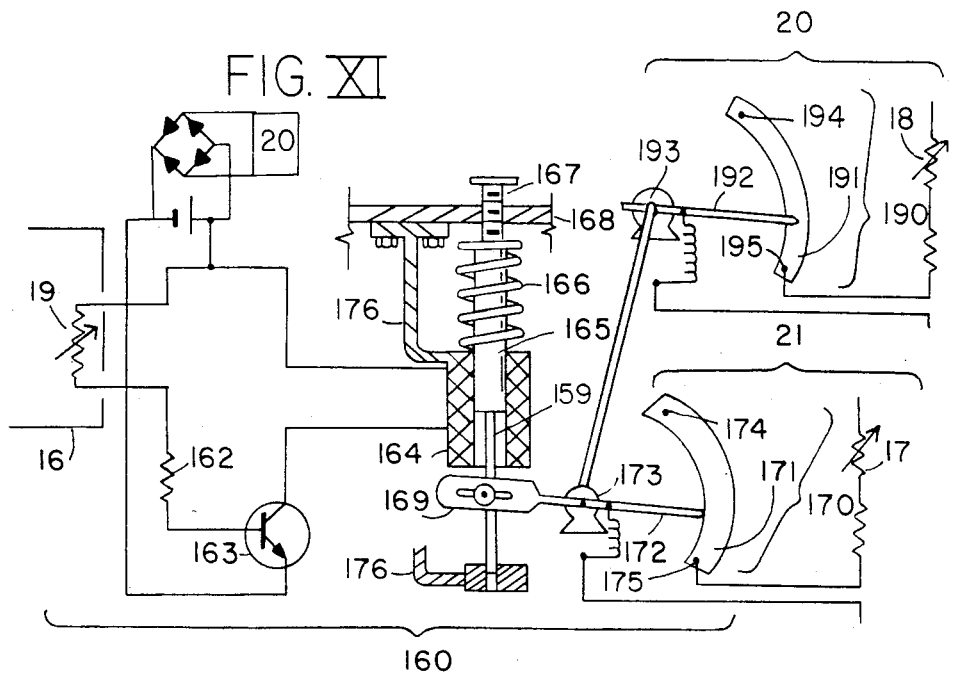
FIG. XI
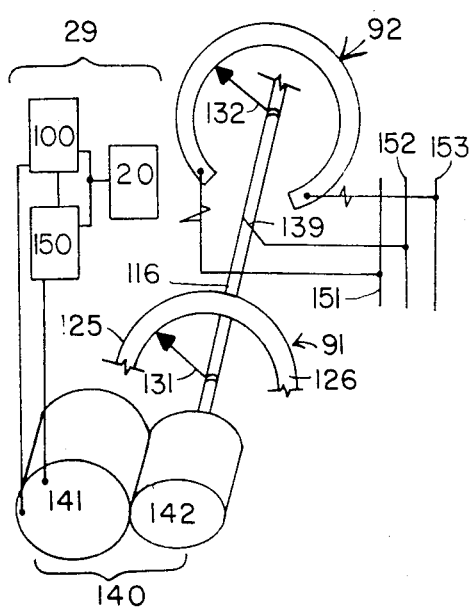
FIG. XII
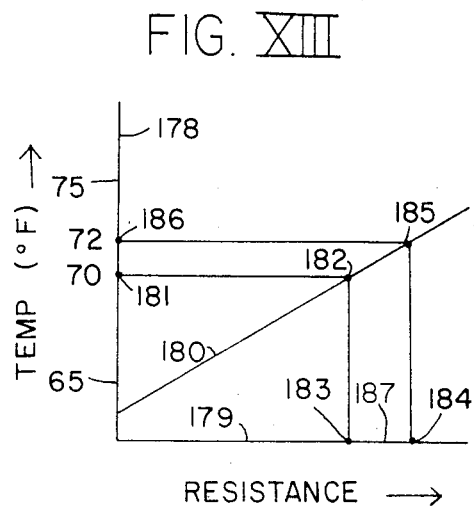
FIG. XIII
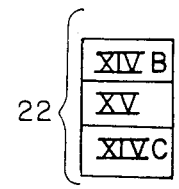
FIG. XIV

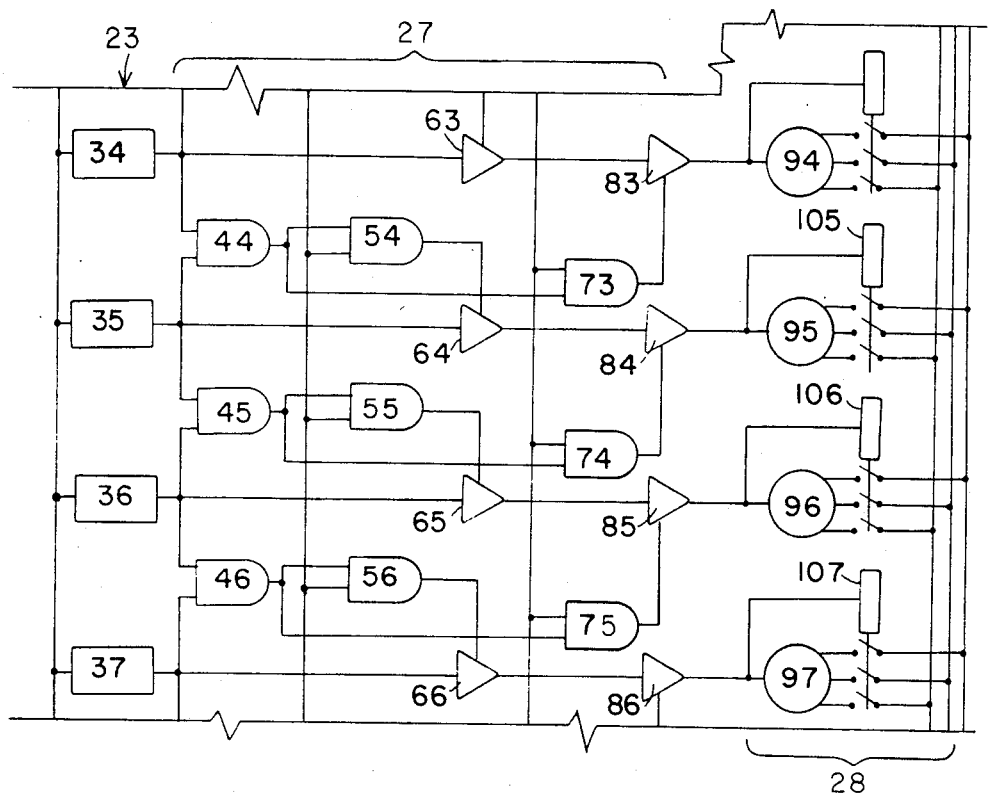
FIG. XV
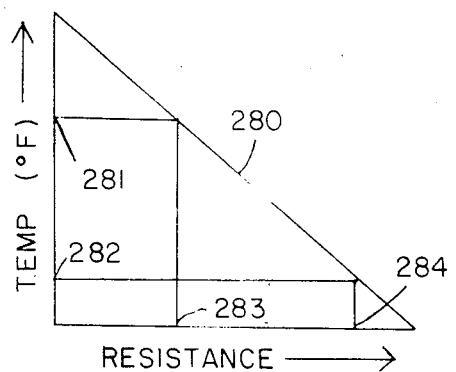
FIG. XVI
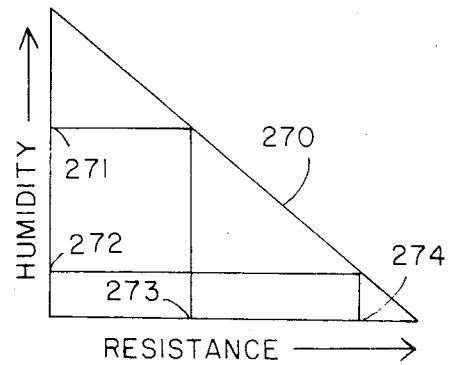
FIG. XVII

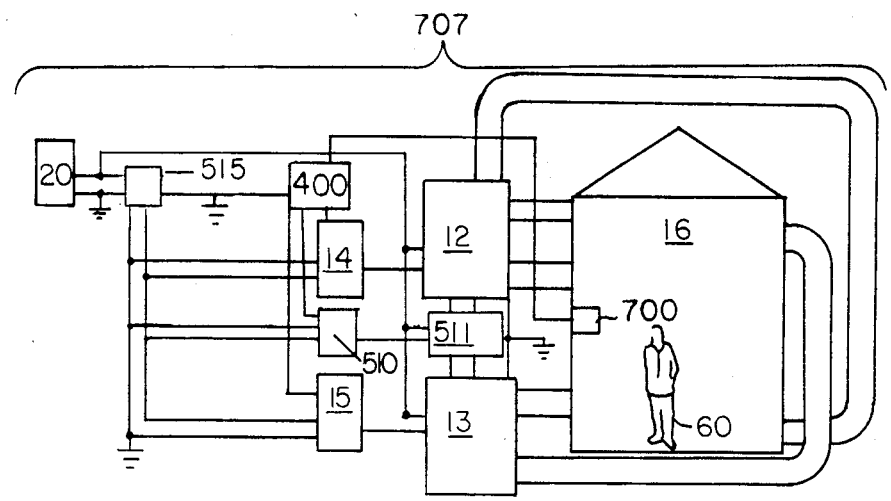
FIG. XVIII
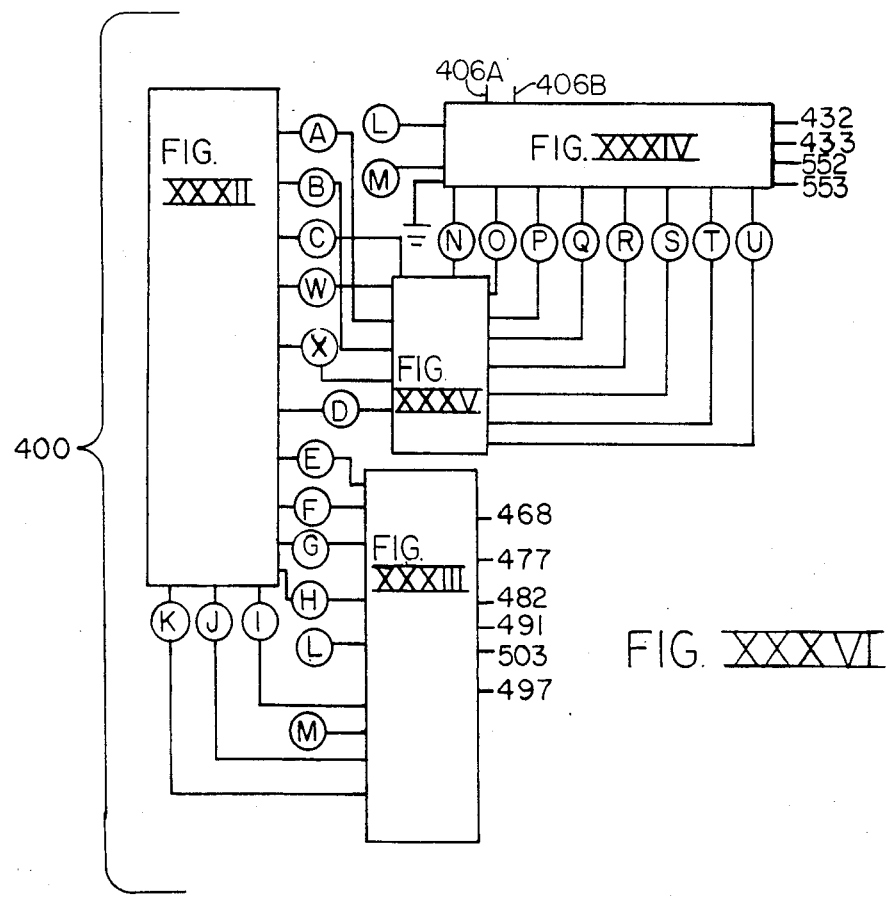
FIG. XXXVI

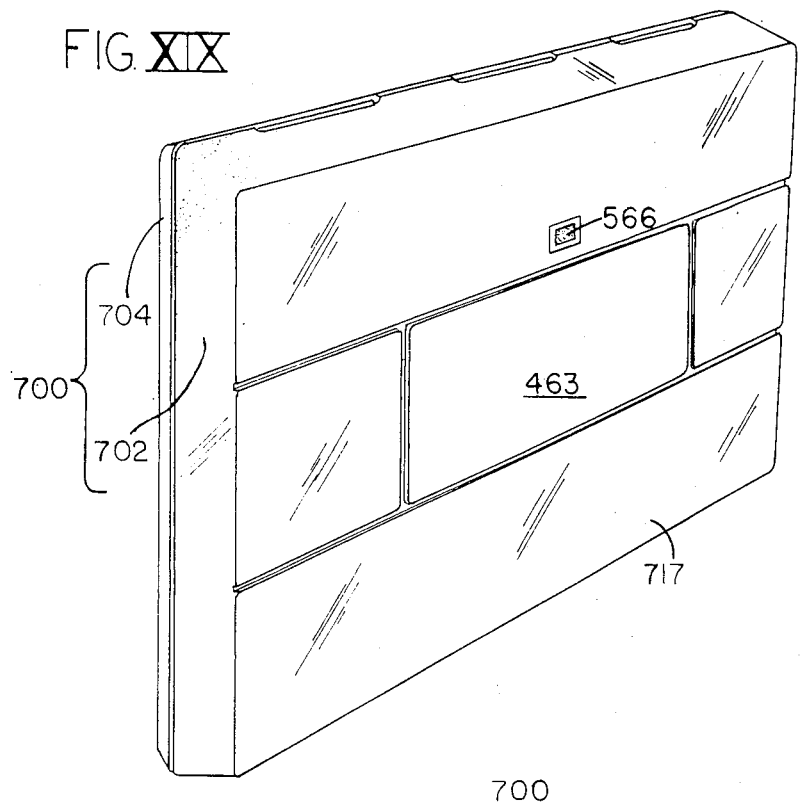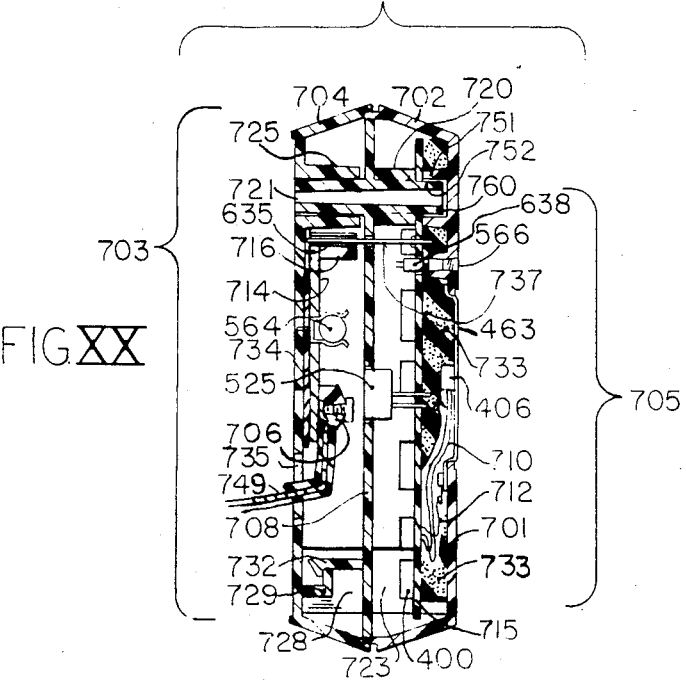

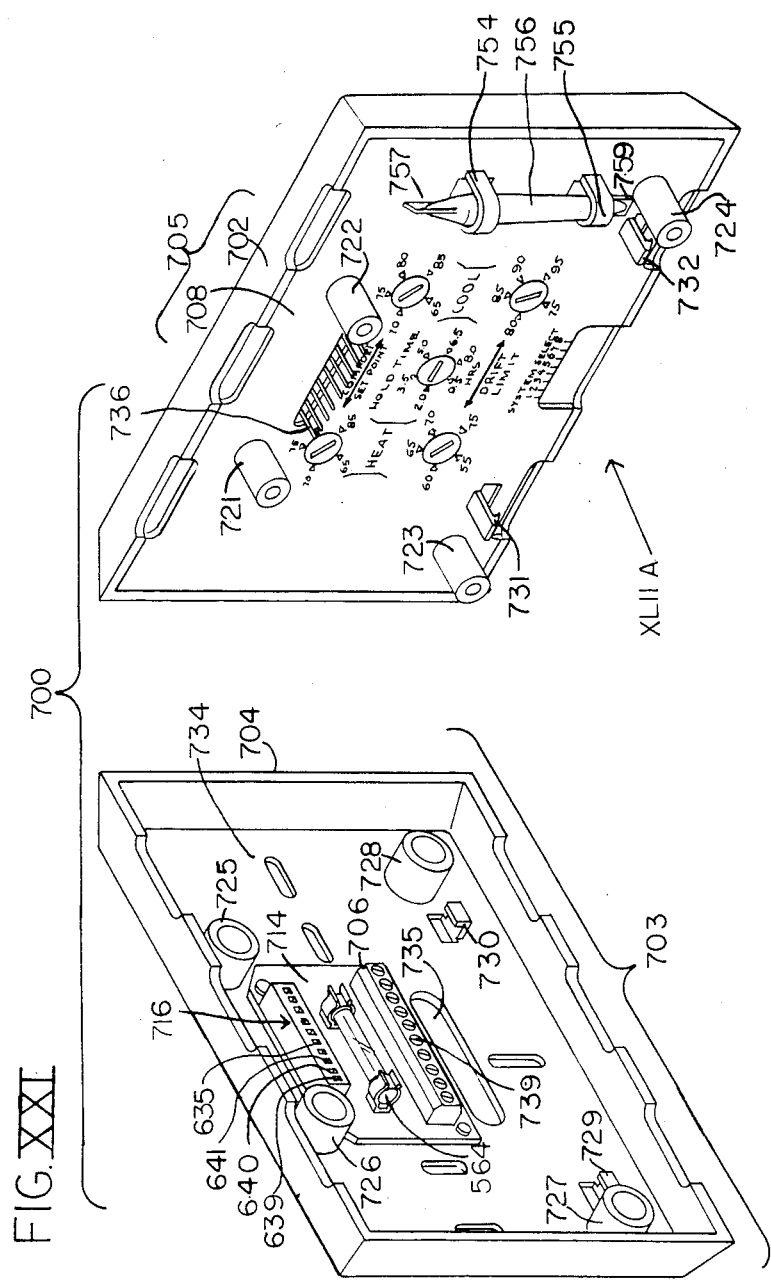
FIG. XXI

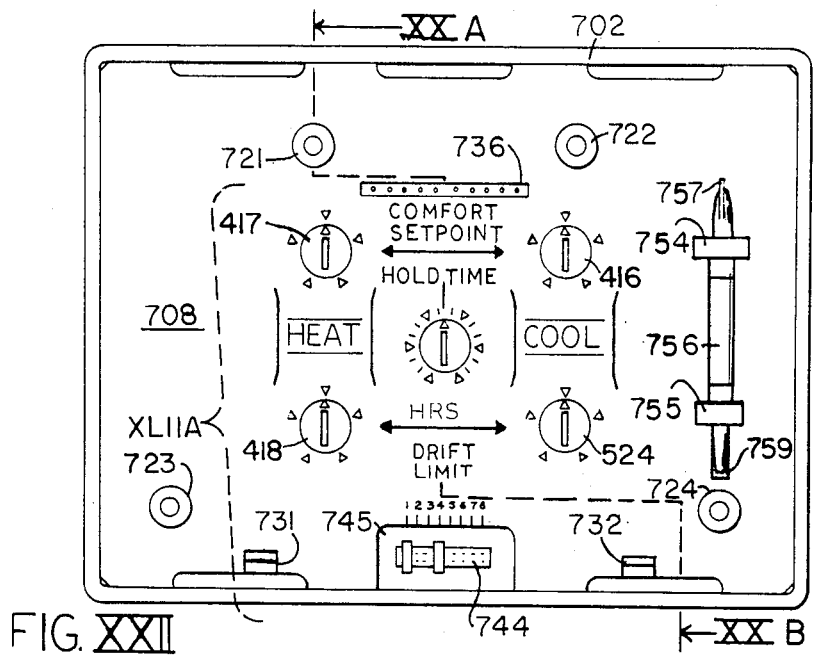
FIG. XXII
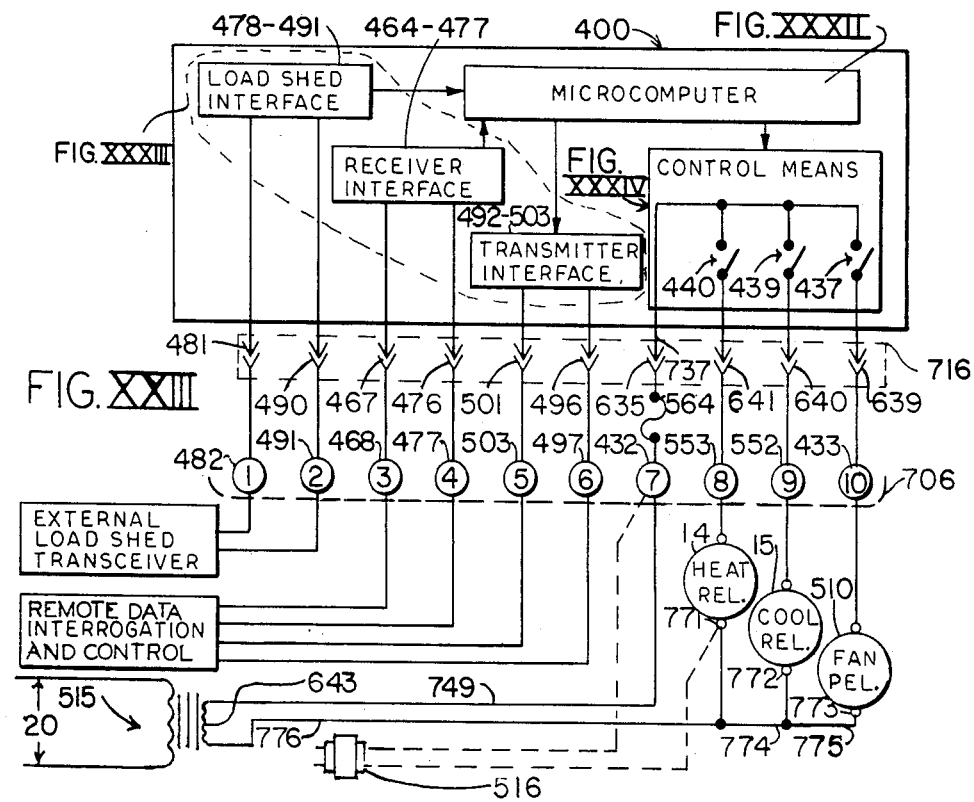
FIG. XXIII

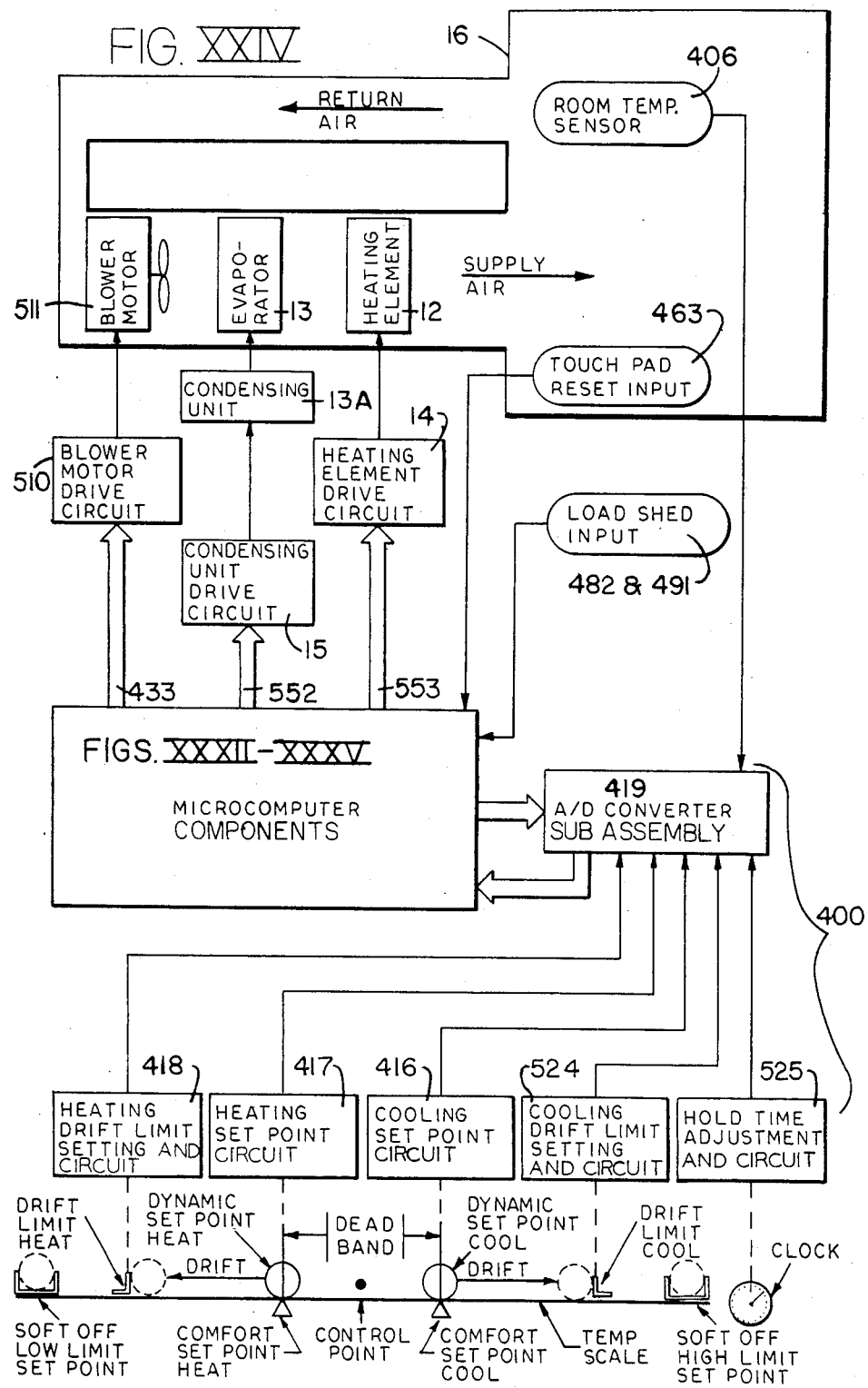

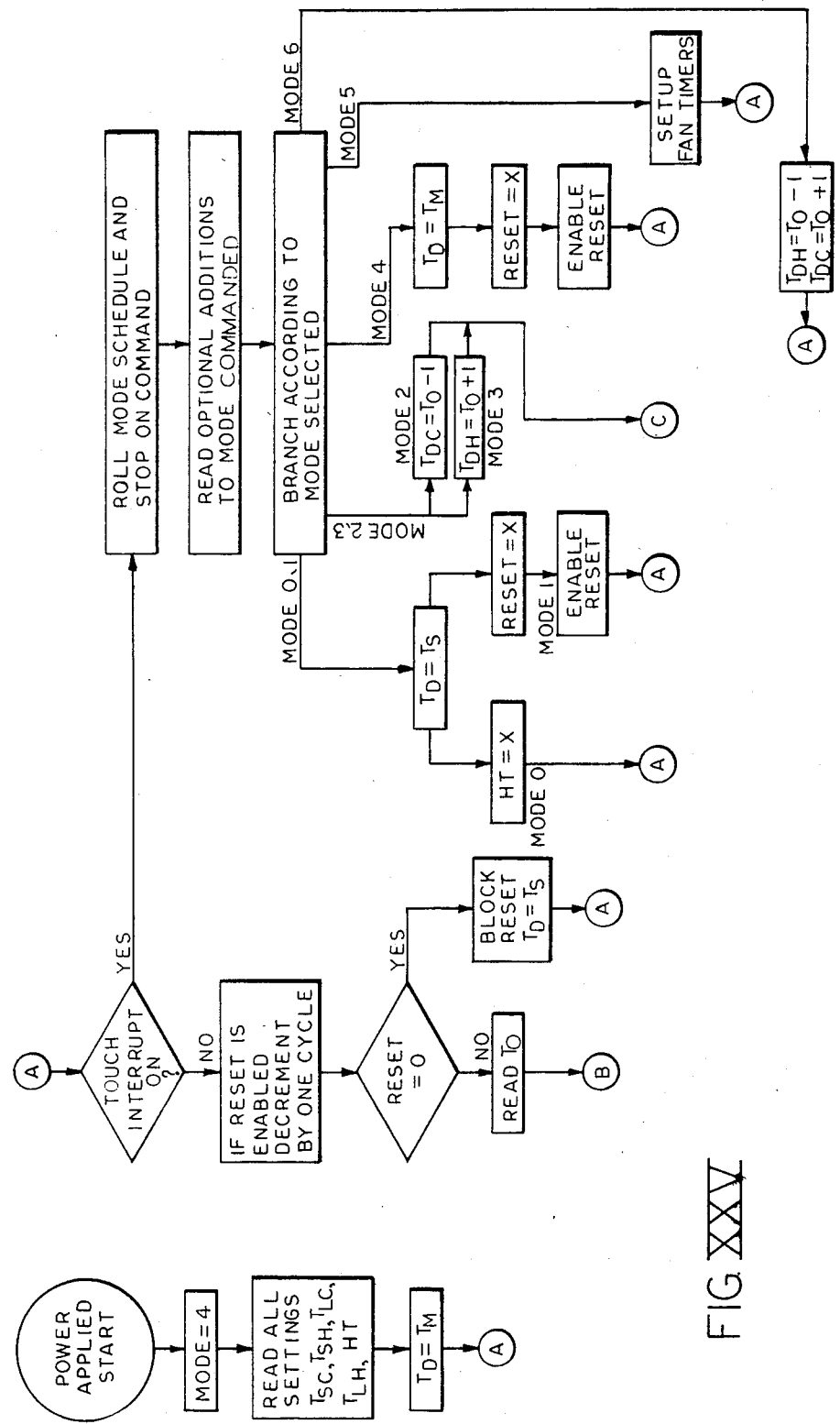
FIG XXV

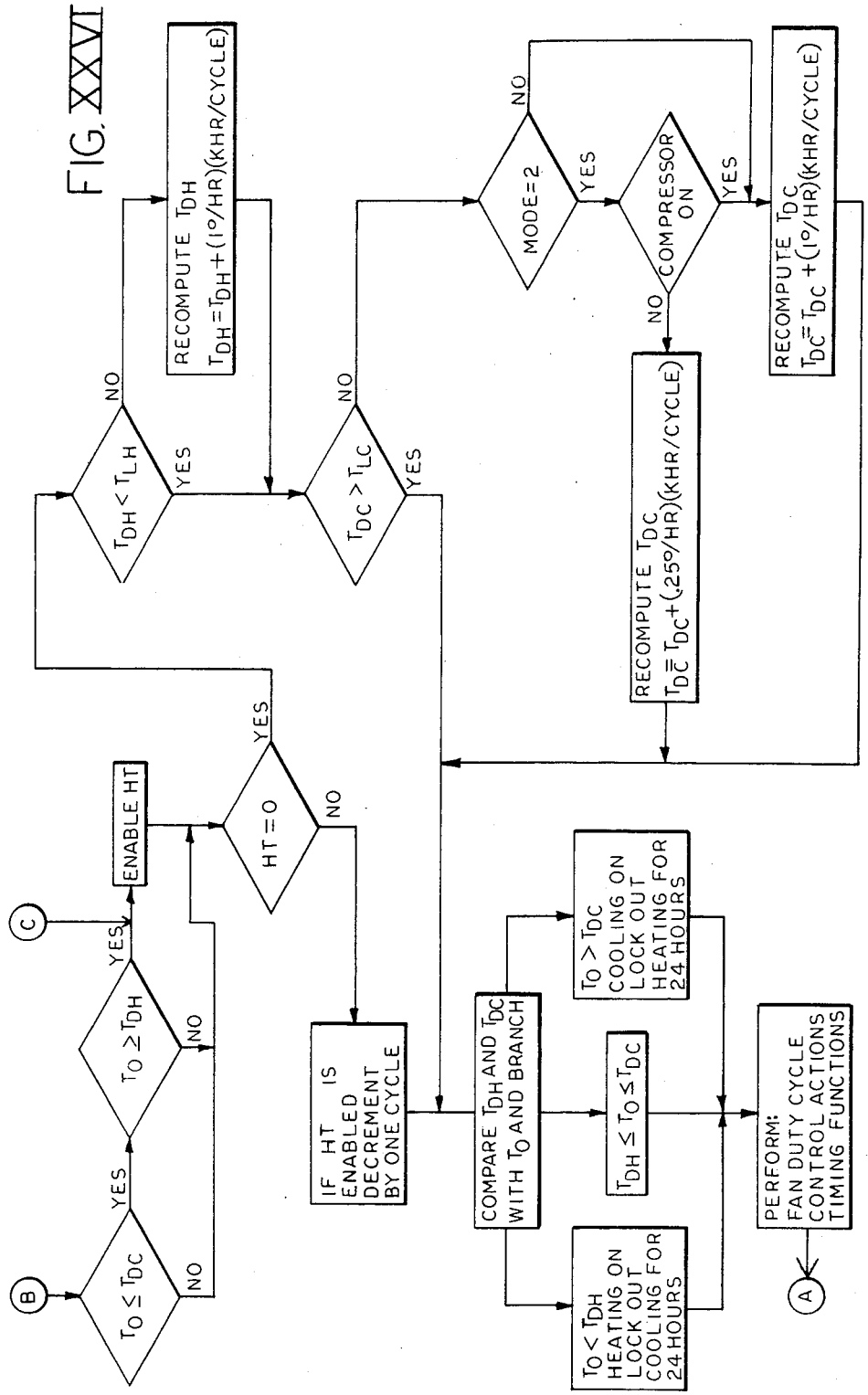
FIG. XXVI

| LEGEND | |
|---|---|
| SYMBOL | DESCRIPTION |
| $T_S$ | COMFORT SETPOINTS-GENERAL |
| $T_{SC}$ | COMFORT SETPOINT-COOLING |
| $T_{SH}$ | COMFORT SETPOINT-HEATING |
| $T_L$ | DRIFT LIMIT-GENERAL |
| $T_{LC}$ | DRIFT LIMIT-COOLING |
| $T_{LH}$ | DRIFT LIMIT-HEATING |
| $T_D$ | DYNAMIC SETPOINT-GENERAL |
| $T_{DC}$ | DYNAMIC SETPOINT-COOLING |
| $T_{DH}$ | DYNAMIC SETPOINT-HEATING |
| $T_M$ | SOFT OFF HIGH AND LOW LIMIT SETPOINTS |
| $T_O$ | PSEUDO-OPERATIVE TEMPERATURE |
| HT | HOLD TIME COUNTDOWN CLOCK-COUNTER |
| RESET | COUNTDOWN CLOCK-COUNTER |

FIG. XXVII

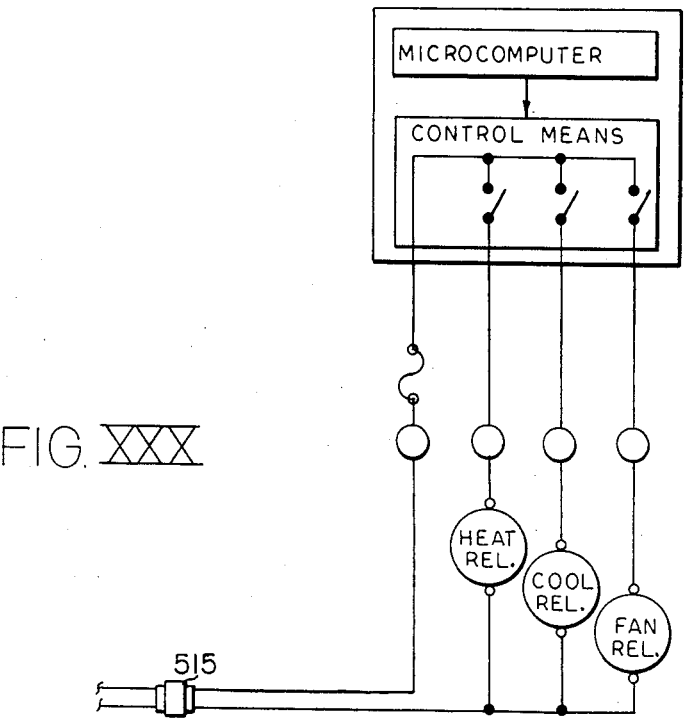

FIG. XXX

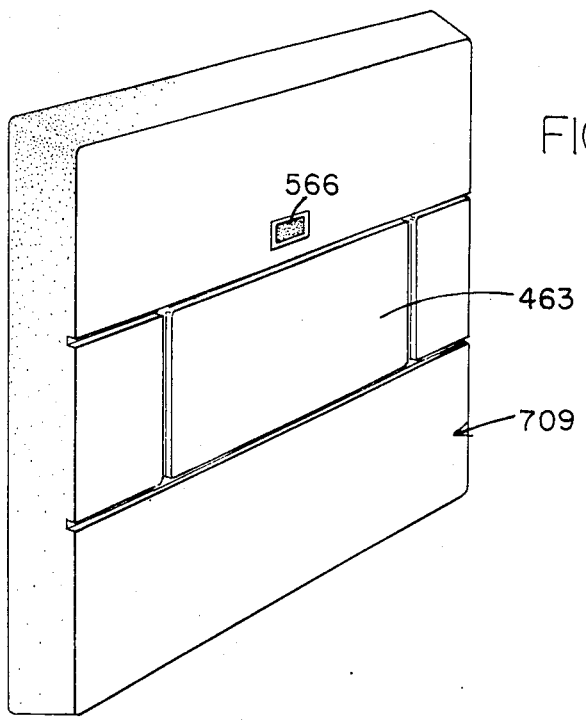
FIG. XXVIII
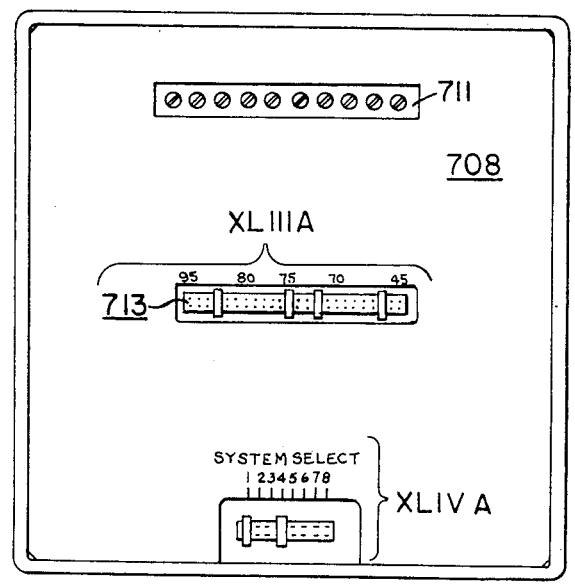
FIG. XXIX

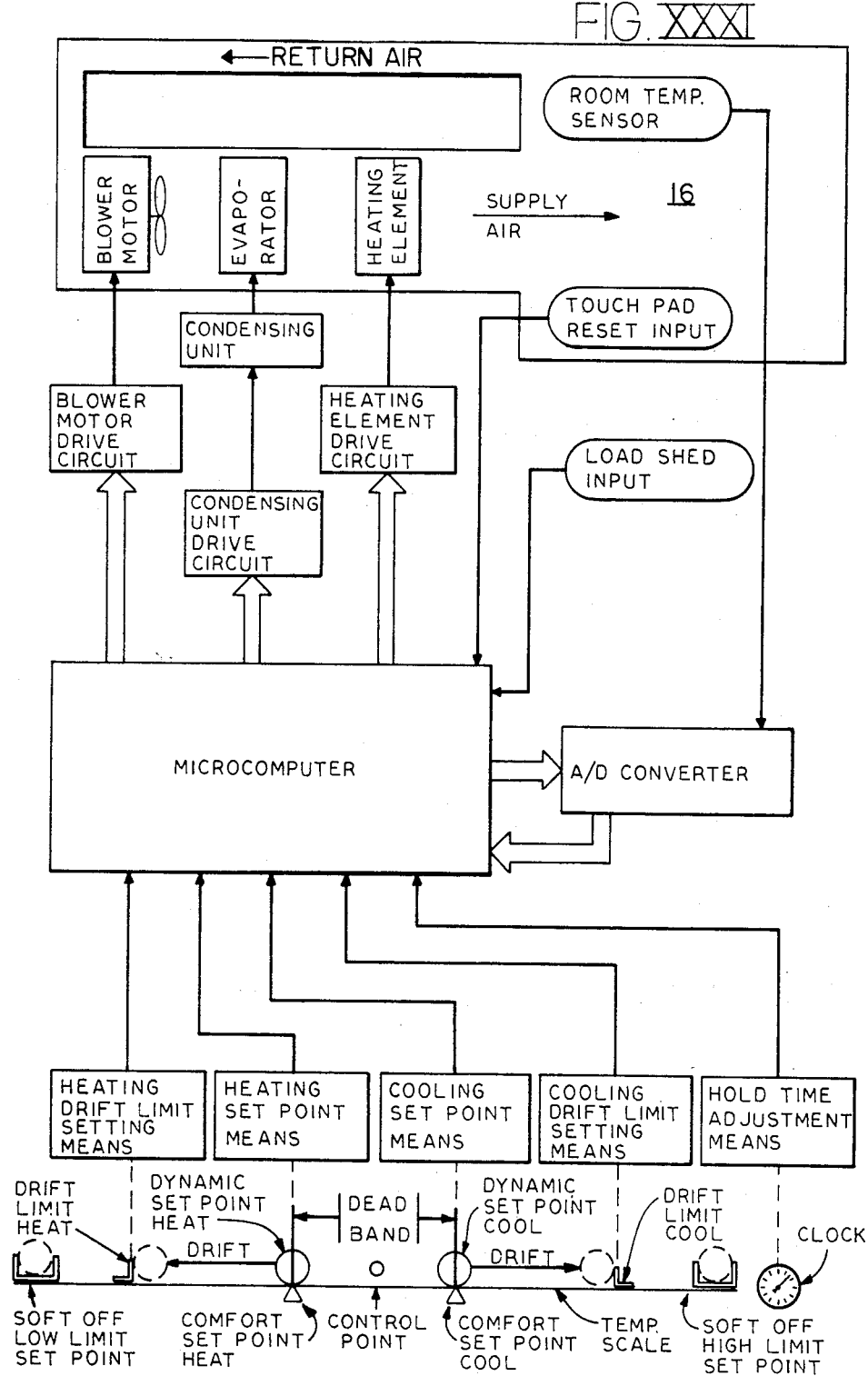
FIG. XXXI

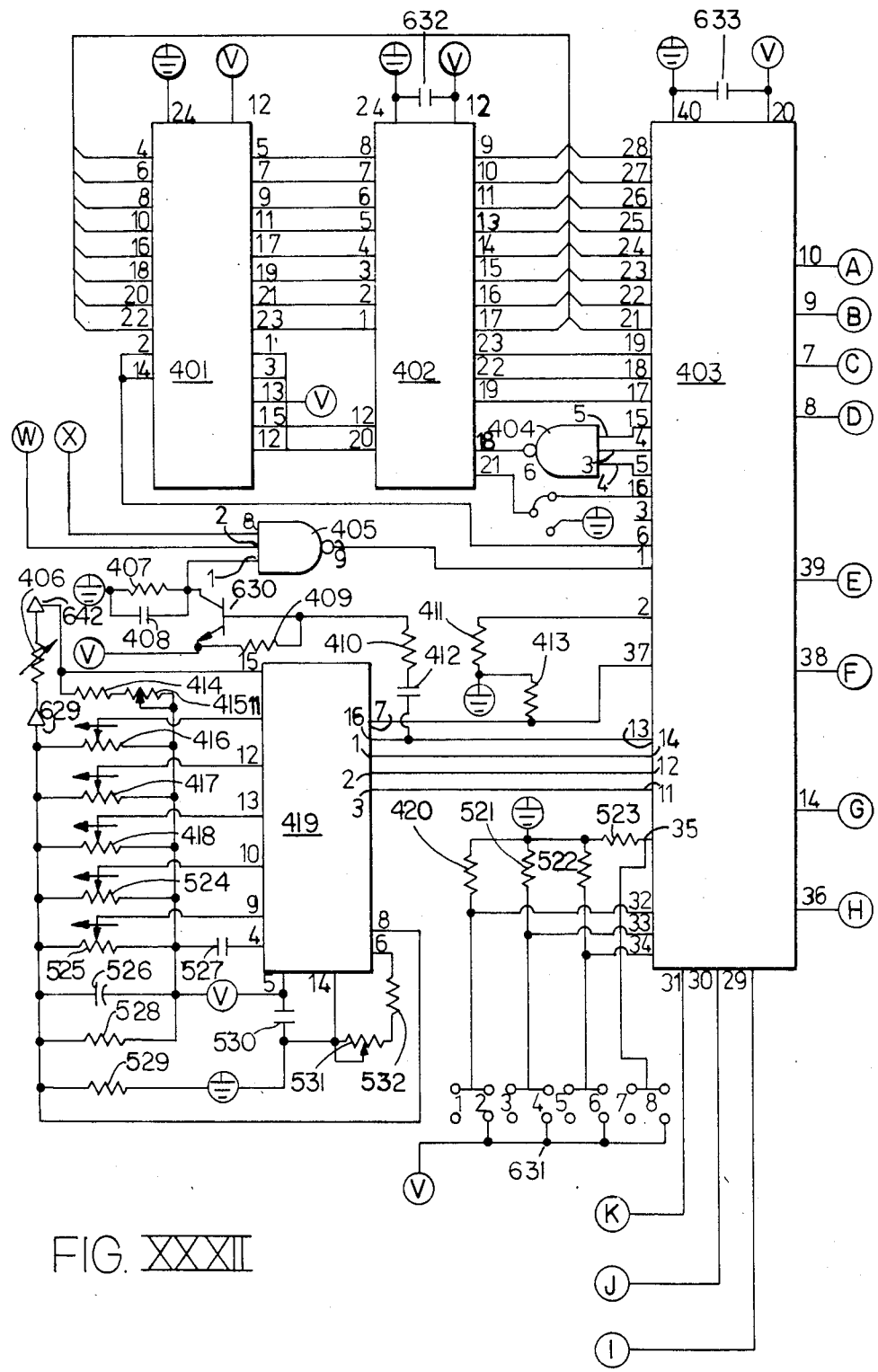
FIG. XXXII

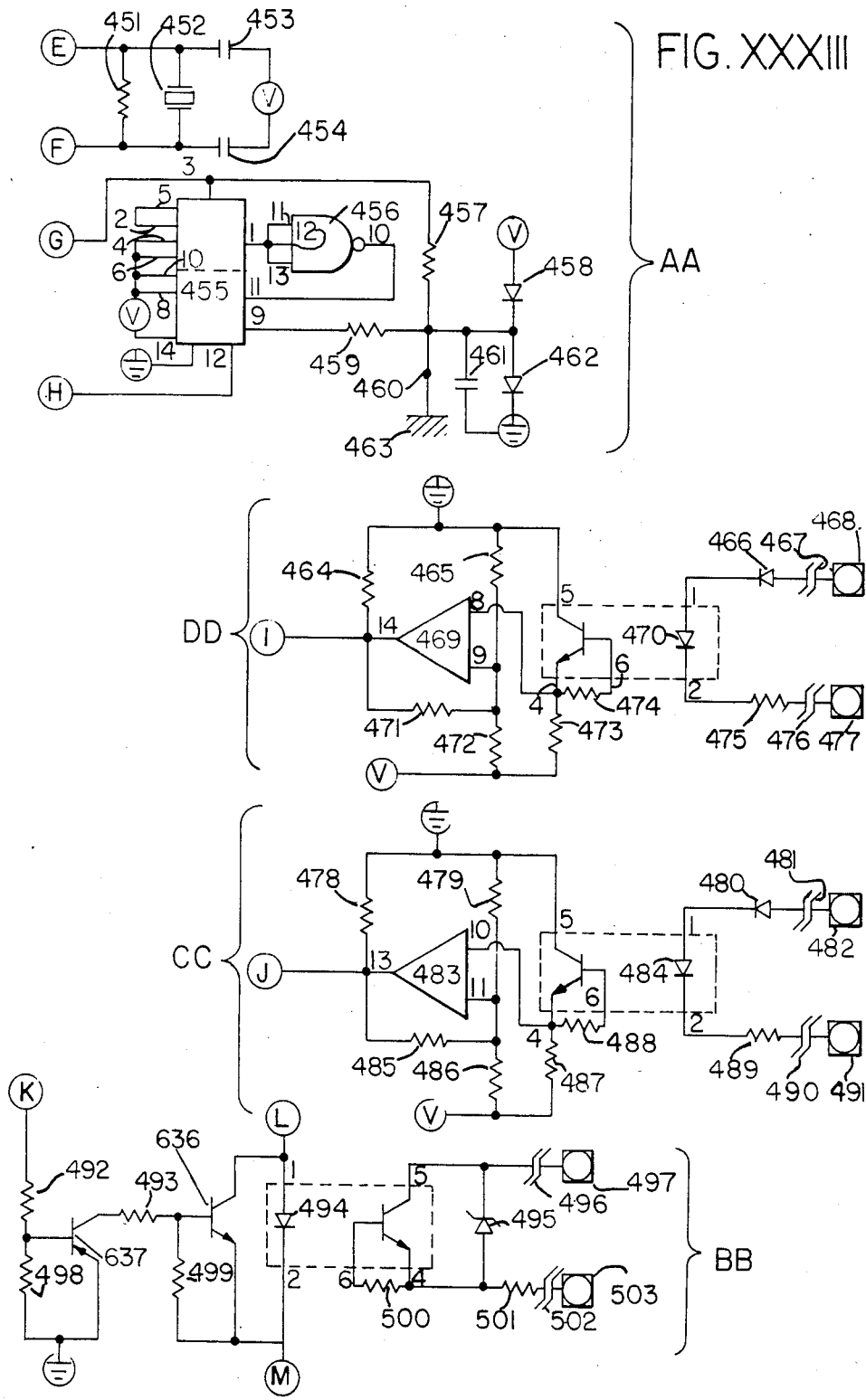
FIG. XXXIII

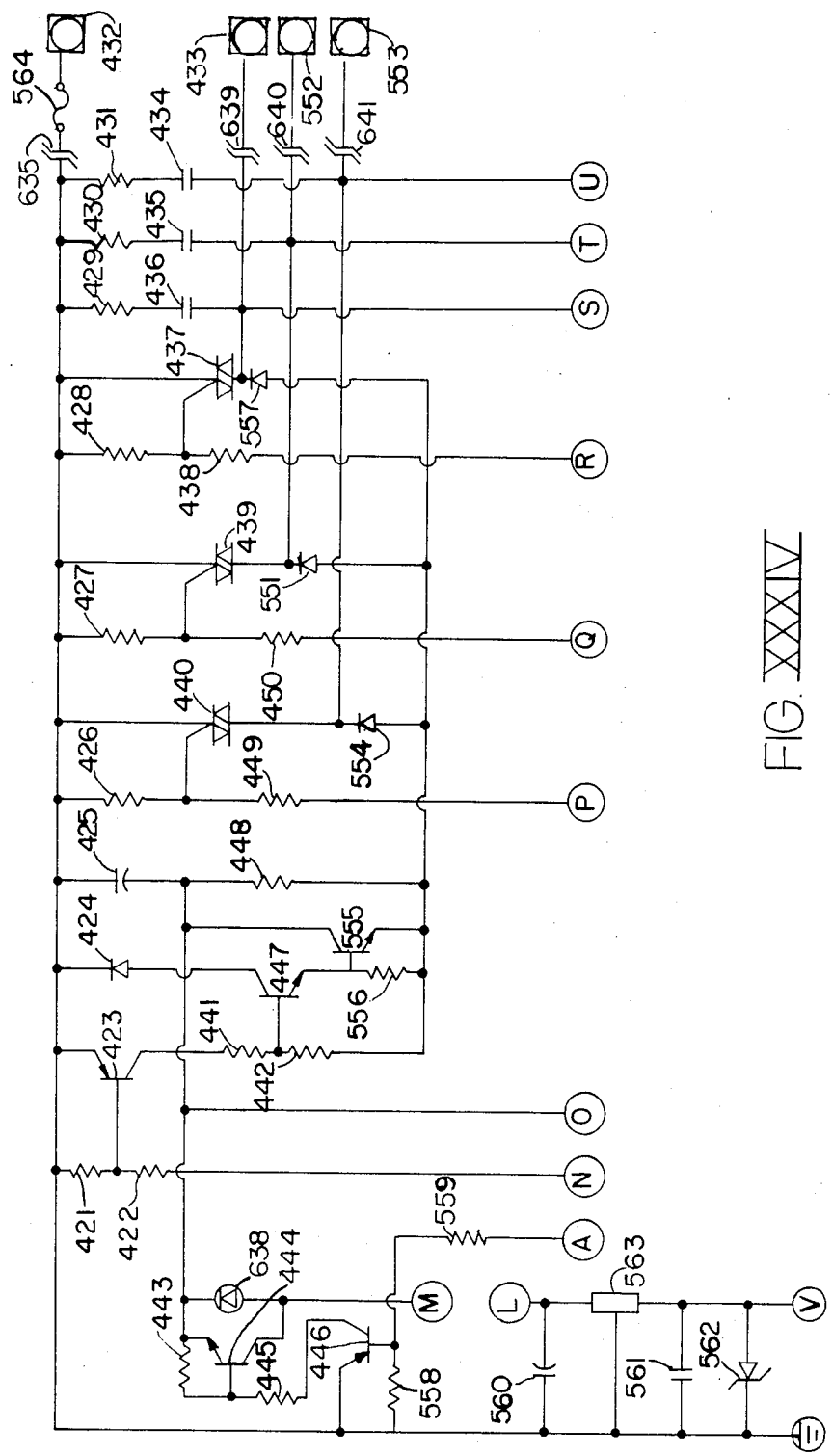
FIG. XXXIV

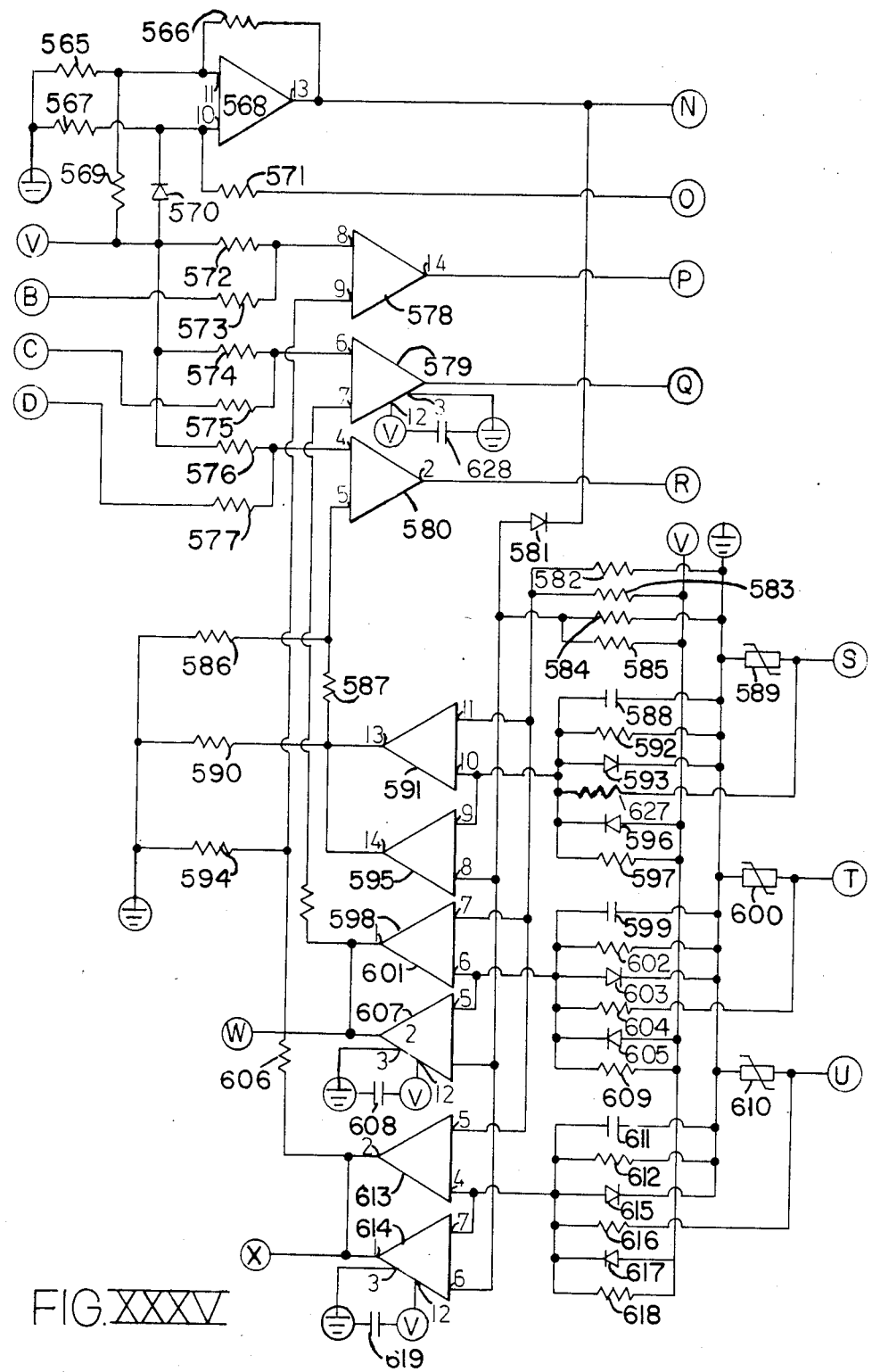
FIG.XXXV

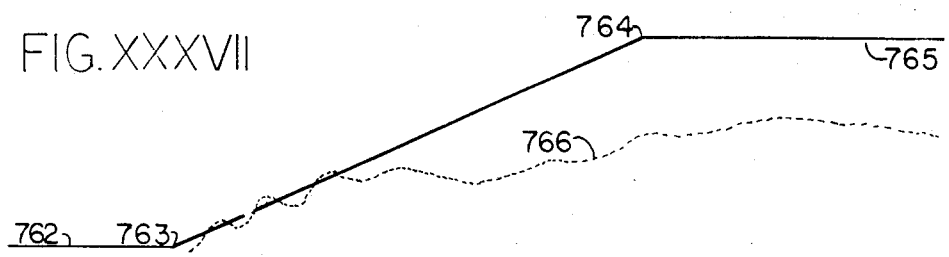
FIG. XXXVII
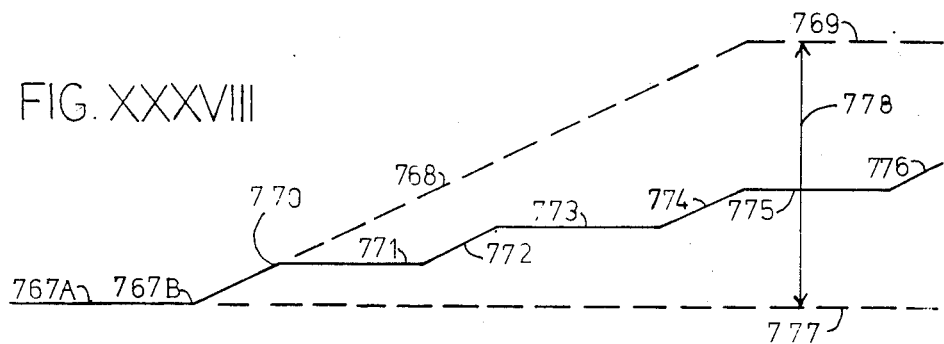
FIG. XXXVIII
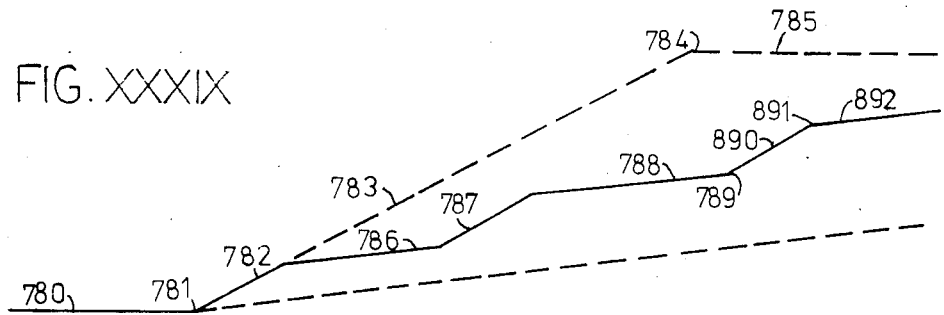
FIG. XXXIX

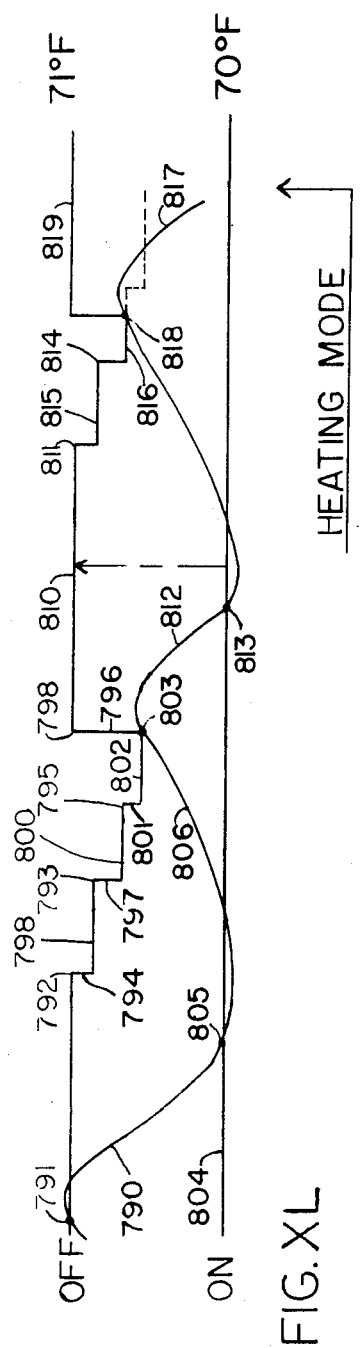
FIG. XL
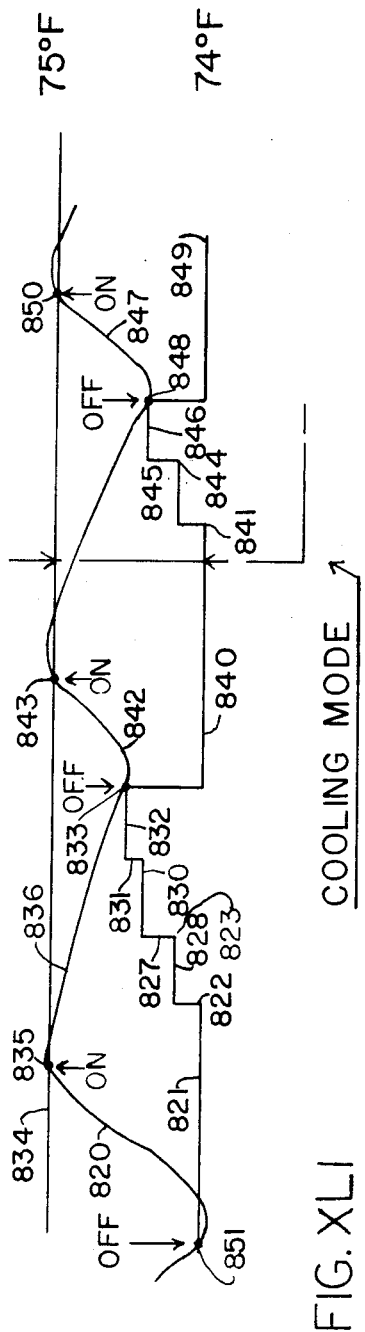
FIG. XLI

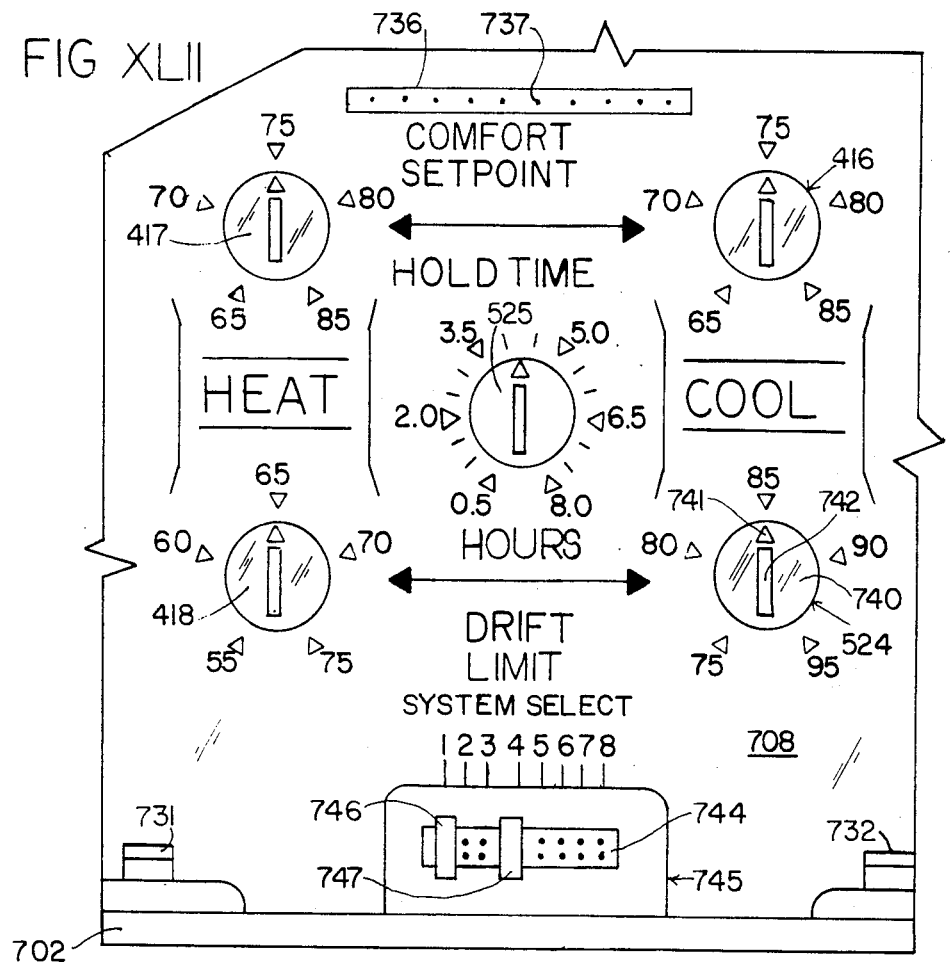
FIG XLII
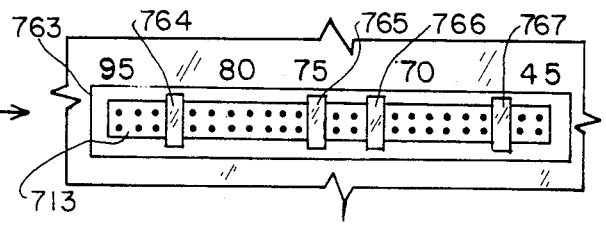
FIG. XLIII
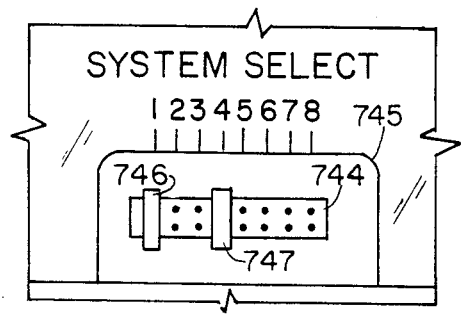
FIG. XLIV

TEMPERATURE CONTROL SYSTEM WITH PROGRAMMED DEAD-BAND RAMP AND DRIFT FEATURES

This is a division of application Ser. No. 539,371, filed Oct. 5, 1983, now U.S. Pat. No. 4,557,317 and a continuation in part of my pending application Ser. No. 06/236,177 filed Feb. 20, 1981, now abandoned.

BACKGROUND OF THE INVENTION

1. Field of the Invention

Temperature and humidity sensing apparatuses, systems and control processes which modulate air heating and cooling apparatus in environmental control systems.

2. The Prior Art

The conventional residential thermostat with its on-off-auto, heat-cool sub-base is too complex for most occupants to operate efficiently, and some of the more recent energy-conserving thermostats which require instruction booklets are even more complicated to operate, and do not provide a simple solution to energy conservation.

The Emergency Building Temperature Restrictions were promulgated July 5, 1979, under the U.S. Department of Energy, 10 CFR Part 490. These restrictions made it prohibitive in commercial and public buildings for an operator to set the thermostats so that energy is consumed to raise the room dry-bulb temperature above 65 deg F. (18 deg C.) or to set the thermostats so that energy is consumed to lower the room dry-bulb temperature below 78 deg F. (26 deg C.). For many buildings it was impractical to comply with the restriction by simple adjustment of the existing thermostats. There was also considerable reluctance to replace the thermostats due to the guaranteed discomfort as well as cost.

SUMMARY OF THE INVENTION

In one embodiment of this invention, shown in FIGS. I–XVII, means sensitive to air temperature (17 and 18) and humidity (19) in a room of a dwelling (16) are connected through a measuring means (21) having an output (208) proportional to such temperature and humidity to a control circuit (23). The control circuit (23) is connected to and directs heating and cooling units (12 and 13) within the dwelling (16). The program control circuit (23) provides programs of progressively changing signals to progressively change the effective temperature in the dwelling. The system is pre-programmed to permit the space temperature to drift at a controlled rate within a pre-selected dead-band range at a rate of 1 degree Fahrenheit per hour continuously or stepwise. The system saves energy by permitting space temperature to always drift in the energy conserving direction (i.e. up or down) and when actuated brings the space (16) under ideal control before drifting at an unnoticeable rate, as in FIGS. VI and VII, in the energy-conserving direction. Energy abusive over-adjustment does not occur as with other thermostats. Such controlled drift provides greater comfort than thermostats which have a broad dead-band wherein room temperatures within the dwelling can rise or fall rapidly and energy is saved while making comfort available at all times to a human occupant (60) within such room or space within the dwelling because the rate of change of the drift of temperature (1 deg. F./hr.) is not noticeable to a human occupant.

Another set of embodiments of the invention provide systems and apparatuses for energy efficient demand reponsive processes for controlled heating and cooling of occupied areas of a building for human habitation, each said process comprising a variety of process steps, one of which steps is a controlled ramp temperature sequence, which sequence includes varied initial and/or final temperatures and duration of such ramp step, and another of which included steps may be the setting of the ramp sequences by an occupant to effect such sequences in predetermined time relations to a variable controlled and/or predetermined periods of time for steady state settings, all such steps being effected with varied differential band ranges and automatic verification to the occupant of each such chosen process steps on initiation and/or operation thereof. Initiation of the steps in such preferred embodiment is by touch sequence of occupant. The result thereof provides substantial energy savings.

BRIEF DESCRIPTION OF THE DRAWINGS

FIG. I is an overall view of the principal assemblies within the system 10 according to this invention.

FIG. II is a detailed showing of the terminal portions of the logic system 27 of cycle selector assembly 22 and the resistor bank subassembly 28 of the overall range control circuit or assembly 23 in zone IIA of FIG. I.

Figure 1:
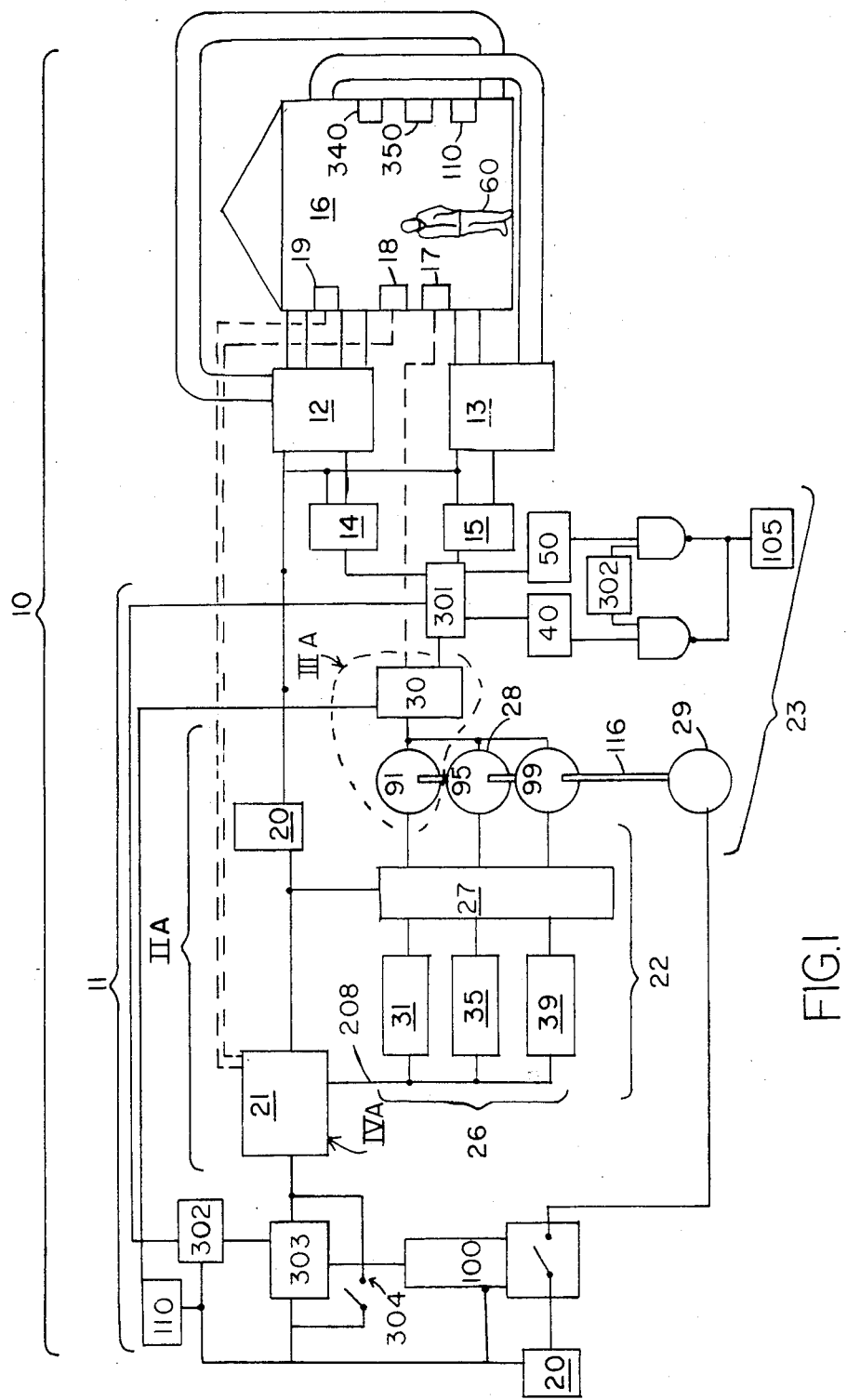

FIG. III is a diagrammatic showing of electrical component block connections in zone IIIA of FIG. I.

FIG. IV is an electrical diagram of parts and connections of apparatus in zone IVA of FIG. I.

FIG. V is an equivalent circuit diagram of the integrated circuit 200 in zone VA of FIGS. III and IV.

FIG. VI shows the temperature charges and stages in a heating cycle control operation of the system of FIG. I according to one embodiment of process of this invention.

FIG. VII diagrammatically shows the temperature changes and stages in a cooling cycle control operation of the system of FIG. I according to another embodiment of process of this invention.

FIG. VIII diagrammatically shows parts and connections within one resistor bank unit assembly, 91.

FIG. IX shows principal parts of a pulse drive mechanism 24 within resistor control unit 29.

FIG. X shows circuit connections and parts of the unijunction timer 111 of FIG. IX.

FIG. XI is a diagrammatic showing of an electrical circuit and mechanical parts within a humidity sensor and control unit 160 of which parts are shown in FIGS. I, III and IV.

FIG. XII shows principal parts of a motor drive assembly mechanism 140 within resistor control unit 29.

FIG. XIII diagrammatically shows the graphical relationships of temperature, humidity and electrical resistance within a control circuit as in FIGS. III and IV using a thermistor and a humidity transducer each having a positive temperature coefficient.

FIG. XIV shows the relation of components shown in FIGS. II and XV.

FIG. XV shows an intermediate portion of the logic system circuit 27 of cycle selector assembly 22 and resistor bank assembly 28 of range control assembly 23.

FIG. XVI diagrammatically shows the relations of temperature and electrical resistance of a thermistor with a negative temperature coefficient used in the circuits of FIGS. III and IV.

FIG. XVII diagrammatically shows the relations of humidity transducer with electrical resistance of a humidity transducer with a negative temperature coefficient used in the circuits of FIGS. III and IV.

FIG. XVIII is an overall diagrammatic view of a system 707 using an improved control unit 700 according to this invention.

FIG. XIX is a perspective view of the completed apparatus unit 700 in the casing 702 therefor.

FIG. XX is a composite vertical transverse section taken along the broken section line shown as XXA-XXB of FIG. XXII.

FIG. XXI is an exploded isometric view of the principal subassemblies of control apparatus 700 showing the interior view of the backplate support assembly 703 and the front plate control unit 705.

FIG. XXII is a rear view of the front plate control unit 705 as seen along the direction of the arrow XXIIA of FIG. XXI.

FIG. XXIII is an installation wiring diagram showing the relationship of the inputs and outputs assemblies that are operatively connected to the electronic assembly components 400 of the control apparatus 700.

FIG. XXIV is a diagrammatic illustration of the overall operations and overall structures therefor of the overall system 707 of which control apparatus 700 is a part.

FIG. XXV and XXVI are diagrammatic illustrations of the operation flow diagram logic for system 707. FIG. XXVI is a logic and flow diagram continuation.

FIG. XXVII is a legend of the symbols used for the operation flow and logic diagrams of FIGS. XXV and XXVI.

FIG. XXVIII is a perspective view of a second record embodiment of apparatus, 709, according to this invention.

FIG. XXIX is a rear view of the front plate control unit of the embodiment shown in FIG. XXVIII showing use of screw terminals as 711' in lieu of plug-in connections and elimination of potentiometers of unit 705 by using a jumper-pin strip 713 and jumpers 764–767 in opening 763.

FIG. XXX is an installation wiring diagram for the unit 709 shown in FIGS. XXVIII and XXVIX.

FIG. XXXI is a diagram illustrating operation and overall structure therefor of a system using the apparatus 709 shown in FIG. XXVIII.

FIG. XXXII to XXXV show in enlarged view the electrical connections for the component sub-assemblies in the overall electrical system of components 400 of the control apparatus 700 connected as shown in FIG. XXXVI FIG. XXXVI is a diagrammatic view of the overall relations of the electrical assembly components 400 within the control apparatus unit 700; it illustrates the electrical connection between the components shown in FIGS. XXXII, XXXIII, XXXIV and XXXV.

FIGS. XXXVII, XXXVIII and XXXIX show details of ramping steps for cooling mode operation according to this invention.

FIGS. XL and XLI respectively diagrammatically show heating and cooling curves and change of lengths of cycles sensed and controlled according to the apparatus of this invention.

FIG. XLII shows zone XLII A of FIG. XXI in an enlarged mode to illustrate the numerical indicia in such zone for which labels for the rheostats are applied.

FIG. XLIII and XLIV respectively show zone XLIII A and XLIV A of FIG. XXIX at enlarged scale.

Table III sets out characteristics of the electrical components of FIGS. XXXII to XXXV. The number of the terminals of each integrated circuit to which wires are attached for connection to the components of assembly 400 are indicated to those Figures.

Table IV sets out the modes of operation of the apparatus 700.

DESCRIPTION OF THE PREFERRED EMBODIMENTS

The system 10 of this invention comprises a program control apparatus 11, a house heating unit 12, a house cooling unit 13, a heating unit control relay 14 and a cooling unit control relay 15. The heating unit and cooling unit are operatively connected to a building or dwelling 16. The program control apparatus 11 provides for control of the heating unit 12 and cooling unit 13 to provide temperature change of one degree Fahrenheit per hour on controlled drift.

The program control apparatus 11 comprises, in operative combination, a power source 20, a cycle selector assembly 22, and a temperature control assembly 23.

The cycle selector assembly 22 comprises, in operative combination, a temperature sensor unit 21, a frequency sensitive selector circuit assembly 26 and a logic unit assembly 27, all connected together as in FIGS. II, XIV and XV and below described. Temperature sensor unit 21 comprises a 555 integrated circuit 200, connected to other components in an electrical circuit as shown in FIGS. IV and III.

Temperature sensor elements 17 and 18 for units 30 and 21 respectively and a humidity sensor 19 are located in wall mounted housings therefor in the dwelling 16.

Heating and cooling control switches 40 and 50 are also located in wall mounted housings 340 and 350 respectively in the dwelling 16. The selector circuit assembly 26 comprises a series of generally like frequency sensitive electrical units as 31–39, each sensitive and responsive to one principal or particular frequency of the output of temperature sensor unit 21.

The temperature control assembly 23 comprises a resistor bank assembly 28, a resistor control unit 29, and a temperature range controller unit 30. The temperature range controller unit 30 is a 555 timer as 200 connected with other electrical components in an electrical circuit as shown in FIG. III. The resistor bank assembly or group 28 comprises a series of like connected and arranged and actuated resistor unit assemblies as 91–99 shown in FIGS. II, XIV and XV.

The program control apparatus 11 comprises a frequency sensor and selector unit as one of 31–39 of assembly 22 and a resistor unit as one of 91–99 of assembly 23 for each degree Fahrenheit of the range—as 65 deg F. to 85 deg F. shown in FIGS. VI AND VII,—of operation of the system 11. The terminal apparatus portions shown as XIV B and XIV C in FIGS. II and XIV and comprising sensor units as 31–34 and resistor units 91–94 and sensor units 37–39 and resistor units 97–99 and circuit elements connected thereto as shown in FIG. II are representative of the terminal portions of the circuitry of selector assembly 22 and control assembly 23. Additional intermediate units as sensor units 35 and 36 and resistor units as 95 and 96 and circuitry therebetween are provided between and connected to units 34 and 94 and 37 and 97 respectively as shown in FIG. XV; the number of such additional intermediate units is greater than those shown in FIG. XV as representative of such additional intermediate units in order to provide one sensor unit as 33 and one resistor unit as 93 for each degree Fahrenheit of the range of operation of the program control apparatus 11.

Components and connections of one resistor unit assembly, 91, are shown in FIG. VIII. Each of the resistor unit assemblies as 91–99 has different resistance values of its components, as 121–124 of unit 91, than other assemblies in the resistor bank assembly or group 28.

The resistor control unit 29, in one embodiment of apparatus, 140, shown in FIG. XII comprises a return unit 150 and a 12-hour motor, as 141, whose output completes one 360 degree complete revolution in twelve hours, and which is coupled with gearing 149 to provide continuous change of resistance values between the resistor bank terminal wires as 151, 152 and 153, which wires are connected to the overall resistance portions as 128 and 129 on each side of the wiper arms as 131 of the resistor units as 91–99. Wires 151, 152 and 153 are connected at the input of the temperature range controller unit 30 for continuous operation as in FIG. VI. Reversing unit 150 is connected to relay 109 and power source 20 and is actuated automatically upon cessation of operation of the cycle of operation of motor 141 to return to control shaft 116 of the resistor assembly 28 to its start position.

In another embodiment of resistor control unit apparatus, shown in FIG. IX, the resistor control unit 29 comprises a return unit 150, and a pulse drive assembly 24 which provides timed and stepped increments of resistance value change in the value of resistors of the resistor bank units connected at the input of the temperature range controller unit 30 for stepped operation as illustrated in FIG. VII.

In general, the program control apparatus 11 is directed to provide programs wherein the temperature may controllably drift or change within the dwelling, as 16, by one degree Fahrenheit (0.6 deg. C.) per hour. The direction of the drift will generally be in the direction from which the control signal comes but will always be in the energy conserving direction which tends to eliminate the immediate call for heating or cooling energy input.

LOGIC UNIT ASSEMBLY 27

The logic unit assembly 27 comprises an electrical circuit with a heating control switch 40, and a cooling control switch 50 located in housings therefor in the dwelling 16 and AND circuits as 41–48, 51–57 and 71–77 and inhibiting circuits as 61–67 and 81–87.

The circuits of assembly 27 provide that with the temperature sensor 21 activated at a given temperature, e.g. 74 degrees F., and only one of frequency sensor and selector circuit units as 31–39 activated only one of the relays as one of 101–109 respectively is actuated to control the switch arms therefor and respectively connect one of the resistor bank unit assemblies as one of 91–99 via wires 151, 152 and 153 to the temperature range control unit 30. When, however, two frequency sensor and selector circuit units as 32 and 33 are concurrently actuated because of overlap in range of temperature sensed and reacted to by both such neighboring sensor and related circuit units (as 32 and 33) then selection of only one or another resistor unit assembly of two adjacent resistor unit assemblies as 92 and 93 is automatically effected by the logic circuit 27 as hereinbelow described. The outputs of adjacent or neighboring frequency sensor and selector circuits units in assembly 27, as for example units 32 and 33, are connected to a common AND circuit, as 42, and that AND circuit (42) is connected to other AND circuits 52 and 71. Each of the AND circuits 51–57 is connected to the heating control switch 40 and each of the AND circuits 71–77 is connected to the cooling control switch 50. With the heating control switch 40 operating or in closed circuit condition and switch 50 open, actuation of two neighboring units as 32 and 33 serves to actuate the AND circuits 42 and 52; such connection also inhibits, through the inhibitor switch 62, actuation of one normally open relay 103 and provides for connection of the normally open relay 102 and resistors of resistor bank unit assembly 92 so that the cycle of operation of controller 30 with the resistors of the resistor bank unit assembly 92 of resistor bank assembly 28 is initiated. Similarly on the heating cycle (switch 40 closed and switch 50 automatically concurrently open) on concurrent actuation of the frequency sensor and selector circuit units 33 and 34, the AND circuit 43 is actuated as well as the AND circuit 53 to inhibit, through inhibiting switch 63, the actuation of relay 104 for the resistor bank unit assembly 94 while the normally open relay 103 for connection of the resistors of resistor bank unit assembly 93 is then actuated and the resistors of that unit assembly 93 are connected to the range controller unit 30.

With the cooling control switch 50 operating or in closed circuit condition and heating control switch 40 automatically open, actuation of units 32 and 33 serves to actuate the AND circuits 42 and 71; such connections also inhibits, through the inhibitor switch 81, actuation of the relay 102 and provide for connection of the relay 103 and the resistors of resistor bank unit assembly 93 so that the cycle of operation of range controller unit 30 with the resistors of the resistor bank unit assembly 93 of resistor bank 28 is initiated. Similarly on the cooling cycle (switch 50 closed and switch 40 automatically concurrently open) on concurrent actuation of the selector units 33 and 34 the AND circuit 43 is actuated as well as the AND circuit 72 to inhibit, through inhibiting switch 82, the actuation of relay 103 for the resistor unit 93 while the normally open relay 104 for the resistors of resistor unit 94 is then actuated and the resistors of resistor unit 94 are connected to range control unit 30.

The particular values of resistances in the resistor bank assembly 28 so connected to unit 30 provide the initial temperature range at the boundaries of which the controller unit 30 provides for turning on and off the heating unit relay 14 or turning off and on the cooling unit relay 15 to maintain the temperature in the dwelling unit 16 within predetermined ranges of temperature. The initial relative value of the resistances as 121–126 is determined by the initial position of each wiper arm as 131 held on the wiper arm drive shaft 116 for unit 91 (and by wiper arm as 132 for resistor unit 92) for a first value of resistance distribution and a total resistance value 128 on one side of each wiper arm as 131 and another resistance value as 129 on the other side of each such wiper arm as 131.

Each wiper arm as 131 and 132 is connected via shaft 116 and a wiper 139 therein to resistance bank terminal wire 152 with terminals of fixed resistances as 121 and 123 connected to wires 151 and 153 respectively. The variable resistances as 122 and 124 provide for precise quantitative calibration.

The operation of resistor control unit 29 progressively changes the values of the boundaries 251 and 252 of the controlled temperature range 253 through the resistances as 128 and 129 connected to the controller unit 30 continually and stepwise in a process as shown in FIG. VII using the apparatus of FIGS. IX and X or progressively changes the boundaries 261 and 262 of the controlled temperature range 263 continuously or smoothly in a process as shown in FIG. VI when a continuously running motor as 141 is used to drive the wiper arm drive shaft 116. Such progressive changes of resistance values progressively changes the position of the range of on and off control by range control unit 30 and provides the programs of on and off operation of the heating unit 12 and cooling unit 13 to provide a controlled drift of the effective temperature in dwelling 16.

In the resistor control unit 29 embodiment shown in FIGS. IX and X the pulse drive mechanism 24 comprises a stepping circuit 145 and a gear drive assembly 146. The stepping circuit 145 comprises a unijunction timer circuit 111 of which the actuating switch 241 is closed when the start relay 100 is actuated at the start of the system 10 by switch 110. The unijunction timer circuit 111 is connected to a solenoid 112 which solenoid drives the gear drive assembly 146. Gear drive assembly comprises a gear train 114 and a ratchet wheel 113; the ratchet wheel 113 drives the gear train 114 and that gear train drives a drive shaft wheel 115; the drive shaft wheel 115 positions and controls the wiper arm drive shaft 116 of resistor assembly 29 on which shaft are firmly mounted wiper arms, as 131 for resistor unit 91, arm 132 for resistor unit 192, and like arms for each resistor unit 93-99 so that, on initiation of operation of the cycle of operation of unit 29, the distribution of resistance values in each resistor unit as 91-99 is regularly changed at a rate providing for a change of temperature range as 253 or 263 in dwelling 16 of ¼ degree Fahrenheit each 15 minutes.

The return unit 150 is connected to electrical power source 20 and comprises a switch 147, a locking circuit 148, and a trigger 149 on the shaft 116. The output of switch 147 is connected to drive the solenoid 117 and a motor 118 to return gear 113 to start position. Alternatively the output of switch 147 may be used to return the motor 141 and gear 142 to start position.

On termination of each cycle of operation of unit 29 as in FIG. IX, (a) the solenoid 117 is actuated by switch 147 to release the escapement lock rod 144 that normally holds the ratchet wheel 113 for stepwise motion in one, clockwise, direction and (b) motor 118 turns a helically threaded shaft 154, which mates with and turns a correspondingly threaded end of shaft 143 of the ratchet wheel 113 and returns the ratchet wheel 113 and shaft 116 and wiper arms as 131 and 132 of all resistor units 91-99 to their start position.

Normally open switch 147 is closed only on release of the relay 100 and is automatically thereafter held closed by a locking timer circuit 148 until shaft 116 is brought to its start position, and then relay switch 147 is opened automatically by a trigger 149 on shaft 116.

OPERATION OF SYSTEM 10 ACCORDING TO FIGS. VI AND VII

Human occupants as 60 in an enclosure as a room in dwelling or building 16 are comfortable although the temperature drifts so long as the rate of drift is controlled or (ramped) to a gradual change. Slow rates of temperature change, approximately 1 degree Fahrenheit per hour (0.6 deg Centigrade per hour) or less are acceptable and allow the temperature during drift to extend beyond the given appropriate comfort temperature range for humans.

Generally for sedentary persons, slow temperature changes from the usual neutral comfort point are indistinguishable from constant temperature conditions.

The thermostat system 10 has a narrow (1 deg F.) "deadband" as 263 in FIG. VI and 253 in FIG. VII and on each of its preselected neutral set-points, but the "dead-band" always drifts at a controlled rate when triggered by a call for heating or cooling by switches 40 or 50 and 110 of apparatus 11. The system 10 does not call for heating or cooling energy input when the room temperature is within the bounds of the "dead-band" upper and lower temperature limits as 251, 252, 261 or 262. The temperature of the air in the building 16 is shown by dashed lines 260 and 259 in FIGS. VI and VII respectively. The energy input zones are shown by hatched zones 264 and 268 A-F and 254 and 258 A-F. The "dead-band" also continues at a controlled drift at times when the apparatus 11 does not call for heating or cooling so long as the rate of drift does not exceed the rate of natural temperature drift of the space. A touch of the finger to the thermostat face plate 110 causes the "dead-band" to move back to a neutral setting, as 75 deg F. in FIG. VI Limits can be set to the extent the thermostat's "dead-band" would drift from neutral setting.

In the preferred embodiment, the operator as 60 in dwelling 16 adjusts the thermostat unit 21 by touching start button or switch 110. The system 11 does not have the conventional dial that is set or twisted to adjust; the operator 60 touches a conductive plate or button 110 which brings the temperature setting of the thermostat as 21 to a preselected neutral point as 75 deg F. in FIG. VI and FIG. VII. A thermistor sensor and humidity transducer determines when the setting is satisfied for unit 30 and in turn programs the unit 21 to start a setting change, or drift. When the start button 110 is actuated the control unit 30 comes into play and provides for bringing the environment in the dwelling 16 to a preset temperature as is sensed by thermistor 17 (and the variable resistor 170 which is a measure of sensed humidity). After the interior of dwelling 16 is at the desired temperature a signal from the output stage 214 is produced.

Such signal's effect on the heating and/or cooling units depends upon whether the heat control switch 40 or the cooling control switch 50 is earlier actuated.

A discriminator 301 which distinguishes between the high and low output signals of the circuit 30 is actuated by response of the circuit 30 to the conditions in dwelling 16 as measured by humidity and temperature components 17 and 19. Such discriminator 301 connects to a flip-flop switch 302 which is actuated thereby and in turn actuates a time delay 303. Accordingly after a fixed time as determined by the time delay 303 the sensor unit 21 begins its program. At the time the sensor unit 21 begins its program the flip-flop 302 has been toggled and the further signals from control unit 30 do not effect the time delay unit 303 until the starter switch 110 is actuated to start another cycle. During the period that the control unit 30 is operated it controls the heating and cooling units 12 and 13 through the relays therefor 14 and 15 respectively. The time at which the temperature sensor unit 21 becomes effective to control the system and begin the program can be actuated by a fixed time delay 303 or the time delay 303 may be made variable depending upon the conditions and dynamic response of the dwelling system and its heating and ventilation and air conditioning system or a bypass switch 304 may actuate the program 21 at a time, for instance, when the occupant leaves the house or at such other time at which the occupant may desire to initiate the cycle programs provided by the sensor unit 21 and the remainder of the unit 11.

The immediate call by button or plate 110 is for the heat or the cooling to be brought into the temperature range as at 264 in FIG. VI or 254 in FIG. VII that the occupant's body needs at that moment, remaining fixed at this re-set temperature as 75 deg F. in harmony with the response time of the heating or cooling system. Response time 265 and 255 is the time required for the heating or cooling equipment for dwelling 16 to bring the environment of the space to within the preselected comfort range. The button or plate 110 may also be connected to sense and make minor adjustments in the preselected temperature as reflected in a further adjustable resistance in series with 17 and 170, to account for discomfort reflected by too great a difference between the temperature of the occupant's fingers as compared to normal.

Touching the plate changes the temperature setting of the thermostat to a preselected neutral/comfort set point because the thermistor 18 and humidity transducer 190 through unit 21, assembly 22 and 23 actuates units 12 or 13 to effect heating or cooling, as required, to bring the room temperature in building 16 into the preselected temperature range as 75 deg. F. as shown in FIG. VI where heating is desired or 75 deg. F. as shown in FIG. VII where cooling is desired.

The set point will remain fixed at this reset neutral/comfort temperature setting for a period of time, as 266 in FIG. VI and 256 in FIG. VII whch is in harmony with the dynamic response of the building—which includes its contents and structure as well as its heating and cooling system. The response times 265 and 266 will vary among systems and structures. The electronic sensor circuit 30 determines when the set point has been satisfied and triggers a timer 304 which, when timed out, starts the set point range 263 (or 253) to slowly drift as shown in FIG. VI (and VII).

The following is a specific example of the winter operation of a controlled drift apparatus 11 installed within a residential environment system as 10 (referring to FIGS. I and VI).

The occupant awakes at 6:00 a.m. and touches the thermostat start switch 110 if the room temperature feels too cool (e.g. 65 deg F.). The circuit 30 responds by calling for the preselected 75 F. plus or minus 1 deg. F. (24 deg C. plus or minus 0.6 deg C.) and provides for 100% heating, and starts operation of the heating unit as at 264 in FIG. VI to satisfy the thermostat and humidity sensor setting and maintains that setting until the room's Mean Radiant Temperature (MRT) approaches the room's air temperature shown by the dashed line 260 as sensed by thermistor 17 and humidity transducer 19.

The occupant leaves for work at approx 7:30 a.m. at which time the space had been warmed to an Operative Temperature of 75 F. (24 deg C.) by 6:30 and has begun to cool down at a rate of 1 deg F./h (0.6 deg C./h). There will be many occasions during cool weather wherein well insulated residential spaces subject to this controlled drift rate will result in no need for heating energy.

By 5:30 p.m. when the occupant returns home from work, the temperature within the space will be say 65 F. (18 deg C.) if the cold weather has continued throughout the day. Although 11.5 hours have passed since the thermostat was touched, an 11.5 deg F. (6 deg C.) drop would not necessarily have occurred even if a 65 deg F. (18 deg C.) minimum limit had not been set. The reason is that the drift does not begin until the space temperature reaches Operative Temperature or the delay timer times out, (shown in FIG. VI as around 6:30 a.m.). Furthermore, if at any time during the day outdoor conditions warm to the point of causing the space temperature to cease dropping, the first call for cooling merely causes the direction of drift to reverse.

Upon finding the space temperature too cool, the thermostat is touched again at 5:30 p.m. to reset the thermostat to warm the space to 75 F. (24 deg C.) or 76 F. (24.5 deg C.) by 6:00–6:30 p.m., and thereafter the drifting resumes. For someone retiring by 10:00–10:30 p.m. the temperature will be no lower than 72 F. (2 deg C.). It will be after midnight when the occupant is asleep and covered with blankets before the temperature drops below 70 F. (21 deg C.).

The following is a specific example of the summer operation of energy saving controlled drift apparatus 11 installed within a residential environment system as 10 (referring to FIGS. I and VII):

The occupant arrives at or awakes at 8:00 a.m. in the room and touches the thermostat start switch 110 if the room temperature feels too hot. The circuit 30 responds by calling for the preselected 75 deg F. plus or minus 1 deg F. (26 deg C. plus or minus 0.6 deg C.).

The thermistor and humidity sensor of temperature range controller 30 call for 100% cooling by the cooling unit 13 to satisfy the thermostat and humidity sensor setting and maintains that setting and operation, as at 254 in FIG. VII until the room's Mean Radiant Temperature (MRT) approaches the room's air temperature 259 as sensed by thermistor 17 and transducer 19. The preset built-in timer circuit as 303 to delay commencement of drift may also be used to delay drift until MRT approximates air temperature 259.

The occupant leaves the room at approx 9:00 a.m. at which time the space had been cooled to an Operative Temperature of 75 deg F. (24 deg C.) and had begun to warm up at a rate of 1 deg F./h (0.6 deg C./h). While there will be many occasions during warm weather wherein very well insulated residential spaces subject to this controlled drift rate will result in no need for further cooling energy.

By 5:30 p.m when the occupant returns to the room, the temperature within the space will be about 83 deg F. (28.3 deg C.) if the hot weather has continued throughout the day. Although 8.5 hours have passed since the thermostat was touched, an 8.5 deg F. (6 deg C.) increase would not necessarily have occurred even if an 82 deg F. (27.8 deg C.) limit had not been set. The reason is that the drift does not begin until the space temperature reaches Operative Temperature or the delay timer times out, which is shown as around 8:30 a.m. Furthermore, if at anytime during the day outdoor conditions cool to the point of causing the space temperature to cease rising, the first call for cooling merely causes the direction of drift to reverse.

Upon finding the space temperature too hot, the system start switch 110 is touched again as at 5:30 p.m. to reset the thermostat to cool the space to 75 deg F. (24 deg C.) and the drifting resumes. For someone retiring by 10:00–10:30 p.m. the temperature will be no higher than 80 deg F. (26.7 deg C.) if the weather had remained severely warm into the night. When the thermostat is touched upon retiring, the room temperature may tend to rise only slightly before the normal early morning cool weather conditions prevent a further rise in temperature.

The system 10 above described has a narrow 1 deg F. (0.6 deg C.) dead-band 253 with boundaries 251 and 252 in FIG. VII and dead-band as 263 with boundaries 261 and 262 in FIG. VI starting on a preselected neutral/-comfort set point, but the set point dead-band always drifts (to right in FIG. VII and to left in FIG. VI) at a controlled rate of 1 deg F./hr. when drifting is triggered by the system satisfying a "call" for heating or cooling. The system 10 neither calls for heating as at 264 and 268 A–F or cooling as at 254 and 258 A–F so long as the room temperature 260 or 259 is within the bounds of the dead-band upper and lower limits as 261 and 262 and calls for heating as at 264 and 268 A–F and cooling as at 254 and 258 A–F only when the temperature of the room shown by dashed line is at the limit of the band and the circuit 30 then actuates the heating or cooling unit 12 or 13 of system 11. The set point/dead-band as 263 and 253 continues controlled drift when the system 11 is or is not calling for heating or cooling.

The system 10 thus provides for greater dwell time in the "energy systems-off" mode periods as 257 A–G and 267 A–267E than in the "energy systems on" periods 264 and 268 A–E and 254 and 258 A–F when energy is supplied to maintain the rate of drift of the air temperature as indicated by lines 260 and 259—within the band limits 263 and 253 respectively resulting in a corresponding reduction in energy consumption. A touch of the occupant's finger to the control button plate 110 causes the set point/dead-band to move back to a neutral setting as 75 deg F. in FIGS. VI and VII. The extent of drift of the set point dead-band from neutral setting (high limit and low limit) can be preset and further limited by field accessible adjustments to accommodate to different personal and seasonal conditions.

On starting the operation of the system 11 and the process as in FIG. VI or VII (by connecting the range controller unit 30), the resistor relay 105 is automatically actuated. The resistor unit assembly 95 then provides the electrical resistances thereof (at the usual start position of assembly 95) across wires 151 and 152 and 153 to the 555 timer unit 200. Such values of electrical resistance correspond to the value of electrical resistances through the thermistor 17 and rheostat portion 170 at the desired comfort value in the dwelling, 16 e.g. 75 deg F. and 50% relative humidity or equivalent effective temperature. Such resistances which are initially connected across wires 151 and 152 and 153 remain so connected for the duration of the period of response time as 265 and the dwell time 266 in FIG. VI and 256 in FIG. VII. At the end of the response timer period as for instance at 6:30 a.m. as shown in FIG. VI, and 8:30 a.m. in FIG. VII when the timer unit times out and the sensor unit 21 and control assembly 22 are then thereby automatically actuated, the sensor unit 21 and assembly 22 then control the sequence of positions of resistor units as 96, 97 and 98 that are subsequently connected to unit 30 on an energy conserving heating operation as in FIG. VI; alternatively units as 94, 93, and 92 are sequentially connected to unit 30 during an energy conserving cooling operation as in FIG. VII. The sequence of connection of the resistor units is determined by actuation of cooling control switch 40 or heating control switch 50. The operation of this system provides heating energy savings proportional to the area 267A–F between areas shown as periods of heating as 264 and 268A–F. The operation of this system also provides cooling energy savings proportional to the areas 257A–G between areas shown aa periods of cooling as on 254 and 257A–F.

In the operation of the apparatus 11 on a heating cycle as in FIG. VI sensor 21 initially senses the temperature in room 16 at the operative temperature as 75 deg F. set by unit 30 and then connects a particular resistor unit, as 95 for a temperature range of 75 deg F. plus or minus ½ deg F. to actuate the unit 30 for the period of response 265 and dwell time 266. Thereafter relay 100 is actuated and the resistor control unit 29 commences then to automatically operate. The resistor control unit 29 then continuously and smoothly progressively changes the values of the assembly 28 resistors as 128 and 129 and thereby lowers the on-off range of reaction of range control unit 30 at the continuous rate of one degree Fahrenheit per hour (to 74 deg F. plus or minus ½ deg F.). When the temperature in zone 16 drops to the lower limit of the range set by unit 30, as at point 291, heating unit 12 is actuated automatically by unit 30 and the temperature in the zone 16 then rises as shown diagrammatically by the room temperature path portions 292 A–F. When the unit 30 is no longer actuated the temperature of zone 16 falls as at portions 293 A–F of temperature path 260.

When the temperature in zone 16 reaches 74 deg F. the sensor unit 21 connects another resistor unit, as 94 to wires 151, 152 and 153. Such other resistor unit sets the range control unit 30 at a different value than did the first resistor unit, 95, connected to range control unit 30 so that unit 30 then sets range of reaction of the heating unit 12 to drift continuously downward to 73 deg F. in one hour without actuating that heating unit. When the zone 16 temperature reaches 73 deg. F. the sensor unit 21 actuates another resistor unit as 93 that provides that range control unit 30 have a 73 deg. F. range (plus or minus ½ degree F.) and so permits the reaction zone or dead-band 263 to drift upwards continuously and smoothly at 1 deg. F. per hour within a range of ½ degree F. The thermistors 17 and 18 are accurate to within 0.2 degree Fahrenheit.

In operation of the apparatus 11 on a cooling cycle as in FIG. VII the sensor 21 initially senses the temperature in room 16 at the operative temperature as 75 deg F. set by unit 30 and then connects a particular resistor unit, as 95, for a temperature range of 75 deg F. plus or minus ½ deg F. to actuate the unit 30 for the period of response 255 and dwell time 256. Thereafter relay 100 is actuated and the resistor control unit 29 commences then to automatically operate. The resistor control unit then continually in stepwise fashion progressively changes the values of the assembly 28 resistors as 128 and 129 and thereby raises the on-off range of reaction of range control unit 30 at the rate of one-fourth Fahrenheit per ¼ hour to 75 deg F. (plus or minus ½ deg F.). When the temperature is zone 16 rises to the upper limit of the range set by unit 30, as at 294, cooling unit 13 is automatically actuated by unit 30 and the temperature in the zone 16 then falls as shown diagrammatically by the room temperature path at 295 A–F. When the unit 30 is no longer actuated the temperature of zone 16 falls, as at portions 296 A–F of temperature path 259.

When the temperature in zone 16 rises to 76 deg F. the sensor unit 21 connects another resistor unit, as 96 to wires 151-3. Such other resistor unit sets the range control unit 30 at a different value than did the first resistor unit, 95 connected to range control unit 30 so that unit 30 then sets the range of reaction of the cooling unit 13 to drift stepwise upward to 77 deg. F. in one hour (at ¼ e.g. F. each 15 minutes) without actuating that cooling unit. When the zone 16 temperature reaches 77 deg. F. the sensor unit 21 actuates another resistor unit as 97 that provides that unit 30 have a 77 deg. F. range (plus or minus ½ degree F.) and so permits the reaction zone or dead-band 253 to drift upward stepwise at 1 degree Fahrenheit per hour within a range of ½ degree F.

The particular described initial setting of the deadbands at 263 and 253 in FIGS. VI and VII at 75 deg. F. is merely exemplary of initial settings in comfort conditions of ASHRAE standard 55-74 i.e., at effective temperature in range of 72 and 78 deg. F. (22.2 and 25.6 deg. C.) and dew points of 35 and 62 deg. F. (1.7 and 16.7 deg. C.)—along the 50% relative humidity line the temperature range is 72–78 deg. F.—and more recent winter and summer conformt envelopes at air movement of 30 f.p.m. or less. Following such initial settings the control drift is put into operation for system 10 by apparatus 11 as above described.

The controlled stepped dead-band operation in FIG. VII is merely exemplary of a stepped controlled drift operation using the apparatus as in FIGS. IX and X and the smooth controlled dead-band operation of FIG. VI is merely illustrative of a controlled continuous drift operation using apparatus as in FIG. VII. Accordingly the stepped characteristics shown in the controlled dead-band drift cooling energy input operation of FIG. VII may also be applied to a controlled dead-band drift heat energy input operation as described in relation to FIG. VI. Variations to ramp rate create varied comfort feelings and are useful when optimum savings is not to be had without some discomfort. Also, the smooth continuous characteristic of the controlled dead-band drift in the controlled heating energy input operation shown and described in relation to the operation shown in FIG. VI may be used in an operation as shown in FIG. VII where there is a controlled dead-band drift during application of cooling energy.

OPERATION OF HUMIDITY SENSOR ASSEMBLY OF FIG. XI

Humidity sensor and control unit 160 comprises in operative combination, and connected as shown diagrammatically in FIG. XI, a humidity transducer 19 located within a wall mounted housing in the room 16, a base resistance 162, an amplifier transistor 163, a solenoid coil 164 within which is located a solenoid piston 165 with an extension arm 159, a piston spring 166 which biases the piston to maintain it in rest position with the piston only partially extended upwardly beyond the coil 164, an adjustment screw 167 which serves to adjust the base or rest position of the piston relative to the coil, and a bracket 176 and base plate 168 on and in which the coil 164 and arm 159 and screw 167 are supported as well as electrical components 162, 163, 170 and 180. The apparatus 160 also comprises a linkage 169 which is connected to the arm 159 of the piston 165 to actuate the wiper arm 172 of the range control unit rheostat 170 and wiper arm 192 of sensor unit rheostat 190. The humidity transducer or humidistat 19 thus actuates two rheostats, one, sensor, rheostat 190, for the sensor circuit 21 and the other, control, rheostat 170 for the control circuit 30.

FIG. XVI shows the electrical resistance characteristics of thermistor 17 of controller 30 as well as the electrical resistance characteristics of the thermistor 18 of sensor unit 21 where both have negative temperature coefficients. In FIG. XIII and XVI the vertical line referenced as "TEMP" and shown as 178 in FIG. XIII indicates increasing temperature in an upward vertical direction and in FIGS. XIII, XVI and XVII the horizontal line referred to as "RESISTANCE" and 179 in FIG. XIII indicates increasing electrical resistance from left to right. In FIG. XVII the vertical line indicated as "HUMIDITY" indicates increasing values of humidity in the upward vertical direction.

The fixed terminal 175 and wiper arm terminal 173 of the rheostat 170 are connected in the electrical circuit of the control unit 30 so that the output of that circuit 30 reacts to the sum or totality of electrical resistance measurements of temperature and the humidity in the monitored and controlled zone 16. The fixed terminal 195 and wiper arm terminal 193 of rheostat 190 are connected in the circuit of the temperature sensor unit 21 so that the output of such circuit 21 reacts to the sum or totality of electrical resistance measurements of temperature as 282 in FIG. XVI and the humidity as 272 in FIG. XVII in zone 16.

As shown by line 270 in FIG. XVII, with a negative temperature coefficient of the humidity transducer 19 in the circuit 160, with a high humidity 271 in zone 16 the electrical resistance 272 of the transducer 19 is relatively low or reduced and the current through the transistor 163 of circuit 160 is low or reduced; as a result thereof the current through the coil 164 is reduced and the displacement of the piston 165 is small or lowered.

The linkage 169 then provides that the portion 171 of the rheostat resistance between wiper arm terminal 173 and fixed terminal 175 of the rheostat resistance 170 applied to control circuit 30 has a low value. With the circuit of unit 30 comprising a thermistor 17 of negative temperature coefficient as shown by line 280 in FIG. XVII the sum or combination of resistance 283 of the thermistor 17 and the resistance 273 of the humidity rheostat resistor 170 has lower total resistance than would be the case where the humidity as 272 and temperature as 282 were at lower value with concurrent higher resistances as 274 and 284 respectively. The linkage 169 also provides that the portion of the rheostat resistance 190 between terminals 193 and 195 of rheostat 190 is applied to sensor circuit 21 and has a low value, and the combination of electrical resistances of the negative temperature coefficient thermistor 18 and of the humidity rheostat resistor 190 have a total lower electrical resistance than would be the case where the humidity and temperatures were cool or at a lower value.

The converse is also true, i.e. when the humidity in zone 16 is low as at 272 the resistance 273 of the humidity transducer 19 is high, the current through the transistor 163 is high and displacement of the piston 165 is large and the linkage 69 then provides that (a) a large portion of the resistor 170 is applied in series with the thermistor resistance 17 as shown in FIG. III while also (b) that a large portion of the resistor 190 is applied in series with the thermistor resistance 18 as shown in FIG. IV.

Accordingly, in the apparatus 11 although the actual temperature in zone 16 of the dwelling may be a given dry bulb temperature e.g. 76.3 deg F. with a high humidity e.g. 80% relative humidity the humanly sensed temperature or effective temperature would be higher e.g. 78.8 deg F. at 40% relative humidity and the output line 208 of sensor 21 would provide, at 76.3 deg F. and 80% relative humidity an output to the frequency selectors as 31–39 as though a higher dry bulb temperature (but the same effective temperature) of 80.6 deg F. at 20% relative humidity were sensed because the resistance due to the temperature as measured by a thermistor would be one value (FIG. XVI No. 283) and the resistance due to the humidity would be additional thereto (Reference No. 273 on FIG. XVII) for a total resistance which would be the sum of the resistances due to the resistance of the thermistor and also the resistance due to the rheostat resistor portion 171. Thus, the control unit 30, via the humidity sensor rheostat 170 of assembly 160 provides that the humidity in the monitored zone or room is automatically taken into consideration together with the dry bulb temperature sensed by the thermistor 17 for the control action of unit 30, i.e. a certain resistance (283 in FIG. XVI) due to the electrical resistance of the thermistor plus the resistance 273 of the unit 170 due to the humidity reading.

Further, where the actual temperature in the dwelling may be 72 deg F. with a low humidity, e.g. 20% relative humidity, the humanly sensed temperature or effective temperature would be lower e.g. like 70 deg F. at a higher e.g., 50% relative humidity and the sensor 21 automatically provides at 72 deg F. and 20% relative humidity in dwelling 16 an output at 28 to the frequency selectors as 31–39 as though a lower dry bulb temperature (of 70 deg F. at higher, e.g. 50%, humidity) were sensed because the resistance due to the temperature is one a value as 283 and the resistance as 273 due to the humidity is added thereto to provide a total resistance as 284 which is as great as that corresponding to a lower dry bulb temperature as 282. The unit 30 under such conditions, via with the sensor rheostat 170 in assembly 160 provides that humidity in the monitored zone or room is automatically taken into consideration together with the temperature sensed by the thermistor 17 for the control action of temperature range controller unit 30.

The rheostats 170 and 190 are thus connected in circuit 160 so as to provide changes in electrical resistance in circuits 30 and 21 respectively that not change in the same direction as the electrical resistances of the thermistors 17 and 18, on change increase in temperature of the interior of building or dwelling 16 but also the amount of change of the resistance of the portions of rheostat 170 and 190 connected to circuits 30 and 21 respectively due to change in humidity; sensed by the transducer 19 provides an amount of electrical resistance change in those portions of rheostats 171 and 191 connected to circuits 30 and 21 respectively that matches the equivalent change in temperature and humidity for comfort purposes, as set out in ASHRAE comfort chart (Hardy, J. D. Thermal Comfort and Health, ASHRAE Journal 31, pgs. 43–51, 1971 and ASHRAE STANDARD 55, Thermal and Environmental Conditions for Human Occupancy.)

Both rheostats 170 and 190 are connected to provide a reduced electrical resistance as the sensed humidity increases when, as is the case with the preferred circuit embodiment of units 160 and 30 described herein, the thermistors of the sensor and control circuits 30 and 21 also have negative coefficients of temperature as shown by lines 280 and 270 in FIGS. XVI and XVII respectively. However, the thermistors 17 and 18 used in circuits 30 and 21 respectively may have positive coefficients of temperature, as shown in FIG. XIII, then the rheostat 170 of humidity control unit 160 would be connected at terminals 173 and 174 to the remainder of circuit 30 as shown in FIG. III and rheostat 190 of the unit 160 would be connected at its terminals 193 and 194 to the remainder of circuit 21 as shown in FIG. IV. With a thermistor having a positive temperature coefficient, as shown in FIG. XIII with a 70 deg F. temperature in zone 16, as indicated at 181 for thermistor as 17 or 18 and—in view of the relationship established by temperature coefficient of resistance line 180—with the corresponding resistance value 183, the electrical resistance value connected to circuit 30 or 21 is increased from the electrical resistance value at 183 by an added electrical resistance value (187 in FIG. XIII) such as is provided by the rheostat portion 193–194 or 173–174 in response to the humidity condition in zone 16 as then measured by unit 160. The effect of the electrical resistance due to the humidity measurement is to reach a total resistance value of 184 because of the added effect at 187 of humidity. Such additive action produces an inapparent higher temperature, as 72 deg. F., as indicated by reference number 186, in view of the temperature coefficient relationship of temperature and resistance at point 185 to which the sensor unit 21 reacts. By such circuit using positive temperature coefficient components when the sensed temperature or humidity increases there is also provided automatic addition of the effect of the total of increased temperature and increased humidity to automatically control the heating and cooling units 12 and 13 of system 11. Such system also provides decreased total electrical resistance in series with the thermistor when the sensed humidity decreases so as to provide automatic addition of the overall decreased effect of decreased temperature and decreased humidity to automatically control the units 12 and 13 of system 11.

The electrical connections of the output of the circuit of FIG. III are then reversed to provide for actuating cooling instead of heating units as below described and the relation of the sensor unit 21 output 208 to the frequency selector circuit assembly is reversed to provide the same functional relationships as herein described for use of the thermistors and humidity transducers with negative coefficient of temperature.

OPERATION OF SENSOR CIRCUIT 21 of FIG. IV

When wired as an astable multivibrator as in FIG. IV the 555-type IC timer 200 is used to generate a square-wave output voltage at 208 of which the frequency has a one-to-one correspondence with temperature. A negative-temperature-coefficient thermistor 18 is used in the IC's charging network.

The circuit's output frequency varies in a nearly linear manner from 38 to 114 hertz as temperature changes from 37 deg F. to 115 deg F. At no point in this temperature range does the frequency count differ by more than plus or minus 1 Hz from the corresponding temperature.

The circuit of FIG. IV uses a thermistor resistor. Transistor 205 is turned on during the charging interval and off during the discharge interval. This transistor's near-zero on-resistance and very large off-resistance result in equal charge and discharge intervals that depend on only the resistance of thermistor 18, resistor 208 and rheostat 190. Operating frequency can then be given by:

$$f = 1/.[2(R18 + R206 + R190)Cln(2)]$$

or, at a fixed value of C, $f = K(R\ 18 + R\ 206 + R\ 190)$.

Frequency variation with temperature, therefore, is similar to the voltage variation of the thermistor/resistor divider network. The divider's output voltage can be expressed as:

$$V\text{out} = \left(\frac{[R\ 206 + R\ 190]}{[R\ 206 + R\ 190 + R\ 18]}\right) Vcc$$

As the denominators of this equation and the frequency equation are the same, the frequency/temperature relationship of the circuit has the same shape and degree of linearity as that of the voltage output of a conventional thermistor/resistor divider.

With a thermistor having an R value of 5,000 ohms at 25 deg C. and a resistance ratio of 9.06:1 over the temperature range of 0 deg C. to 50 deg C., the circuit produces a linearity error of less than plus or minus 1 deg. F. over a 78 deg F. range.

The frequency count of the circuit is the same as the useful Fahrenheit temperature range (37 deg F. to 115 deg F.).

In general, the frequency will be linear with respect to temperature in the 60–100 deg F. interval of interest, but the frequency count is different from the absolute value of the temperature being sensed in view of the above described inclusion of humidity effect.

To minimize circuit error, it is desirable to use temperature-stable polycarbonate capacitors. For this circuit, off-the-shelf capacitors having nominal plus or minus 5% tolerances are employed, with the final capacitance being a number of parallel capacitors hand-selected to give the correct frequency count at a given temperature.

The IC timer itself contributes negligible error to the frequency output over temperature. Power supply bypassing may be provided to avoid sensitivity to supply voltage variations.

OPERATION OF TEMPERATURE RANGE CONTROL UNIT 30 OF FIG. III

Generally, in the circuit of FIG. III the thermistor-resistor divider network 128, 129, 130, 17 and 170 produces a voltage that is directly proportional to effective temperature sensed at thermistor 17 and humidity sensor 19. When the effective temperature is rising (at a fixed value of humidity) the output from stage 214 at terminal 3 of the 555 timer (shown as 200) is high and the threshold input voltage at pin 6 to threshold comparator 211 is determined by the voltage divider set up by resistances 17, 170, and the resistances connected across input wires 151 and 152 from the resistance bank assembly 28, such as the variable overall resistances 128 and 129 of the resistor bank assembly unit 91. Such input voltage increases as resistances across 17 and 170 decreases. When the sum of the resistance of the thermistor 17 and the humidity rheostat 170 portion connected to circuit 30 equals the resistance at the "hot" setpoint temperature (RTH) the divider relationship establishes a voltage of ⅔ Vcc at the threshold input (pin 6). After the input of the internal comparator 211 reaches this (⅔ Vcc) level, the discharge transistor 215 is switched on, effectively placing resistance 130 in parallel with resistor bank resistances as 128 and 129.

As the resistance and/or humidity drops the thermistor and/or humidity resistance increases so that the voltage is divided between (17 and 170) and (130 in parallel with 128 and 129). When the thermistor resistance and the resistance of the humidity rheostat portion in the circuit equals the resistance at the "cold" set point temperature (RTC), the divider produces a voltage of ⅓ input voltage (Vcc) at pin 2.

More particularly, the timer's internal resistive divider 216, 217 and 218 establishes reference voltages at (⅓) Vcc and (⅔) Vcc for each of the timer's comparators 212 and 211 respectively. When an external voltage applied to the threshold input pin (6) exceeds (⅔) Vcc, an output is generated by the threshold comparator 211 that toggles the flip-flop. This turns on the discharge transistor 215 and results in a low output signal from the timer's driver amplifier output stage 214.

A discriminator circuit 301 distinguishes between high and low outputs of the output stage of unit 30 and actuates the heater unit relay 14 and heater unit 12 when heating is needed and when heating control switch 40 is actuated or actuates the cooling unit relay 15 and the cooling unit 13 when cooling is needed and heating control switch 50 is actuated; otherwise the heating and cooling units are not actuated.

The turn-on of the timer's discharge transistor 215 lowers the voltage at the threshold input to less than (⅔) Vcc (at 219). If the trigger input (at 2), to comparator 212 then drops below (⅓) Vcc, the trigger comparator 212 generates a pulse that retoggles the flip-flop 213, drives the discharge transistor 215 off, and causes the output stage 214 to return to its high output level.

This circuit action maintains an environment as 16 within a bounded temperature range. A voltage that is directly proportional to effective temperature i.e. the sum of relative humidity and temperature, will rise at pin 6 along with effective temperature until threshold voltage (⅔) Vcc is reached. The output stage 214 will then change state so that a cooling unit as 13 can be turned on or a heater unit as 12 can be turned off. Effective temperature will then drop until (⅓) Vcc exists at the trigger input pin 2 causing the output stage 214 to return to its first state with the cooler off and the heater on.

For the circuit in FIG. III, the thermistor/resistor divider networks connected to pins 6 and 7 produce the voltage that is directly proportional to effective temperature. When effective temperature is rising (high output state, discharge transistor 215 off) the threshold input voltage at pin 6 is determined by the division between the combination of (R17+R170+R128) and R129—where R17 is the electrical resistance of the thermistor 17 and R170 is the connected portion, as 171 of the humidity rheostat 170 and R128 is the electrical resistance of the portion of the resistor unit of assembly 28 connected to control unit input wires 151 and 152 and R129 is the electrical resistance of the portion of the resistor unit of assembly 28 connected to control unit input wires 152 and 153—and such input voltage increases as the value of (R17+R170) decreases.

When (R17+R170) is equal to the thermistor resistance at the hot setpoint temperature, RTH, the divider relationship needed to establish [($\frac{2}{3}$) Vcc] at the threshold input is:

$$[(Rth+R128)/(Rth+R128+R129)]=\tfrac{1}{3}$$

After an input to the threshold comparator 211 reaches this level, the discharge transistor 215 is switched on, effectively placing R130 (the electrical resistance shown as 130 in FIG. III) in parallel with the combination (R128+R129).

As the effective temperature drops (R17+R170) increase in value, and the division is between (R17+R170) and [R130 in parallel with (R128 and R129)].

When (R17+R170) is equal to the resistance at the cold setpoint temperature, RTC, the divider must produce [($\frac{1}{3}$) Vcc] at the trigger input. The divider relationship becomes: $A/B=\tfrac{1}{2}$ where A=[R130 in parallel with the series combination of (R128+R129)] and B=[RTC in series with the parallel combination of ((R130) and (the series combination of R128 and R129))].

Otherwise expressed as $$[R130 \text{ 11 } (R128+R129)/RTC+(R130 \text{ 11 } (R128+R129))]=\tfrac{1}{2}$$

Therefore, the impedance level of the thermistor and humidistat/resistor dividers is effectively changed depending on whether the thermostat and humidistat (or humidity transducer) be in the rising temperature portion of their operating cycle or the cooling portion. This is necessary since a thermistor's resistance varies quasi-exponentially with temperature and may exhibit a two- or three-fold change over a total temperature range; that is, the thermistor's cold setpoint resistance, RTC, may be several times larger than its hot setpoint resistance, RTH over the entire range of 65 to 95 deg F.

Where a standard thermistor is used and its resistance as a function of temperature is known, as is usual, straightforward design approach applies. Where the setpoint resistance ratio, RTC/RTH, is less than 2, as is usual over a 1 deg F. range, then R128=0 and R129 is 2RTH, so that:

$$R130=2RTHRTC/(2RTH-RTC)$$

(For this analysis, the timer's trigger and threshold inputs do not load the dividers.) Thermistor power dissipation is kept as low as possible to maintain the accuracy of the thermostat's setpoints. By operating the timer from the lowest possible supply voltage—e.g. 5 volts-thermistor self-heating is minimized as well as self heating of the humidity transducer or humidistat 19.

To prevent noise signals from causing premature state changes, the timer's trigger and threshold inputs are bypassed with capacitors 220 and 221 respectively (of 0.01 microfarad capacity) when divider impedance levels are high, the environment is noisy, or long leads are used to connect the thermistor to the circuit.

OPERATION OF TIMING CIRCUIT OF FIG. X

FIG. X is a circuit diagram of timer 111; it operates on a 24 volt power supply and provides a 15 minute or 900 second time delay between closing of the switch 241 and firing of the SCR 240. Such firing of the SCR 240 actuates the coil 112 of the stepping unit 146 of assembly 24.

The circuit of timer 111 comprises unijunction transistor oscillator to furnish the negative pulse to the base of UJT 238 of the unijunction transistor timer. The time constant is T, and where R233 is resistance of 233 in ohms and C237 is capacitance of capacitor 237 in microfarads T=R233×C237=900 seconds.

Unijunction 230 generates a quasi-sawtooth waveform at its emitter; the time period of this waveform is approximately 10 seconds. Capacitor 235 couples the negative-going portion of this waveform to the base 242 of unijunction 238. The amplitude of the negative pulse at base 242 is on the order of 1 volt. (Routine test with the value of capacitor 235 will yield the most desirable value.) If the pulse is too large in amplitude, unijunction 238 will fire too early; if the pulse is too small, firing may be erratic. The unijunction 230 sends a pulse of unijunction 238 once every 10 seconds. This structure provides a 15 minute timer. Exemplary electrical component values of circuit 111 are set out in Table I. Values of the circuit elements of FIG. V are set out in Table II.

TABLE I

| No. | Value |
|---|---|
| 230 | transistor 2N1671B |
| 231 | 20 ohm resistor |
| 232 | 1 meg ohms |
| 233 | 15 meg ohms |
| 234 | 220 vhm |
| 235 | .001 microfarad capacitor |
| 236 | 10 microfarad capacitor |
| 237 | 60 microfarad capacitor |
| 238 | transistor 2N1671B |
| 239 | 20 ohm |
| 240 | SCR |
| 241 | switch (closed by actuation of 100) input = 24 volts |

TABLE II

Data on Circuit of FIG. V

| Ref No. | Description |
|---|---|
| 216 | 5K ohms |
| 217 | 5K ohms |
| 218 | 5K ohms |
| 311 | 4.7K ohms |
| 312 | 830 ohms |
| 313 | 4.7K ohms |
| 314 | 1K ohm |
| 315 | 6.8K |
| 316 | 3.9K |
| 317 | 7K ohms |
| 318 | 10K ohms |
| 319 | 4.7K ohms |
| 320 | 220 ohms |
| 321 | 100K ohms |
| 322 | 4.7K ohms |
| Pin 1 | ground |
| 2 | trigger |
| 3 | output |
| 4 | reset |
| 5 | control voltage |
| 6 | threshold |
| 7 | discharge |
| 8 | Vcc input voltage |

Source: Service Signetics Corporation, Sunnyvale, Calif. as SE 555/NE555

Electrical characteristics are set out at pages 1–6, Table 1–2, of "The 555 Timer Applications Sourcebook, With Experiments", Howard M. Berlin 1976, Capital City Press, Montpelier, VT 05602.

The system 707 shown in FIG. XVIII comprises the thermal comfort dynamics controller, apparatus 700 located in an inhabited space 16 which is used to control systems for heating unit 12, ventilating fan 511 and air conditioning unit 13 common to commercial and residential establishments. The control unit 700 although very different than any of the traditional room thermostats, serves as a direct replacement therefor and provides superior thermal comfort control.

The control apparatus 700 comprises a single printed circuit board 715 packaged within a first precisely molded plastic front housing or casing 702 and a back plate assembly 703 and operatively attached to both; cover assemblies 702 and 708 and board 715 together form a front plate control unit 705.

An operative temperature sensor touchplate 463 is exposed on the outer face 717 on the apparatus 700 along with an indicator LED 638 with window 566. The control dials of adjustable set point potentiometers 416, 417, 418, 524 and 525 are exposed at the rear cover 708 of the assembly 705. The assembly 705 is secured to and supported by the wall of the conditioned space as 16 by means of a back plate assembly 703. Assembly 703 is constructed of and supported by a precise plastic molding cover 704, and includes a terminal strip 706 for connection of field control wiring to the apparatus 700, a plug assembly 716 for electronic connection of the back plate assembly 703 to the circuit board 715, and fuse protection 564 for the assembly 700 from the power source 20.

The rear plate 734 of the back support assembly 703 is a rigid plastic plate and has firmly attached thereto rigid projecting female receptacles 725, 726, 727 & 728 with smooth interior surfaces. The front plate 701 of the front control assembly casing 702 has projecting therefrom and firmly attached thereto rigid cylindrical pedestal portions 721, 722, 723 and 724 with smooth exterior surfaces; these portions slidely engage with the interior surfaces of receptacles 725, 726, 728 and 727 respectively on the back support assembly 703. Each such male pedestal as 721 has a broader or larger diameter cylindrical base or support element as 720 the front end of which is formed into a small diameter connector or nipple 752 which firmly fits into a receptacle 751 therefor which is fixed to the front assembly front plate 701. The nipple 752 fits into a hole 760 therefor in circuit board plate 715. The board 715 is thereby held between the shoulders formed by receptacle 751 and pedestal base 721. Each of the other pedestals 722, 723 and 724 has a similar structure and relation to a hole therefor in front assembly circuit board 715. The board 715 is thereby held between the shoulders formed by receptacle 751 and pedestal base 721. The cover plate 708 is firmly attached to each of the pedestals 721–724 immediately rearward of the base thereof as shown in FIG. XX for pedestal 721. Thereby the circuit board plate 715 and rear cover plate 708 of front control assembly 705 are attached firmly and permanently together yet spaced apart as shown in FIG. XX. A thermally and electrically insulating plate 733 is located between circuit board 715 and the rear of the front plate 701. Plate 733 is rigid to prevent motion of the plate 463 relative to the board 715 and prevents any electrical contact there between.

A back plate printed circuit board 714 is firmly attached to back plate 734 and supports a rigid insulating terminal strip 706 and a rigid plug assembly 716. All of the several like terminals as 432 in strip 706 are each separately electrically connected via separate electrical conductors on the printed circuit board 714 to one of the plugs or receptacles as 635 of plug assembly 716. The rear plate or panel 734 of assembly 703 has a hole 735 therein through which each conductor, as 749, passes and is inserted into a slot below a screw as 739 which secures each such conductor to a terminal as 432 on terminal strip 706, as in FIG. XXIII.

A hole 736 in the rear plate 708 of the front assembly 705 provides for passage of each one of several stiff electrically conductive pins as 737 to extend from their rigid connection to the circuit board 715 into one of the separate receptacles as 635 in the plug assembly 716. Such pins form firm electrical connections between assembly 716 and electrical assembly 400 but are removable from assembly 716 as needed to make settings on the dials of the removable front assembly 705.

L-shaped lugs or ears 731 and 732 are attached to the rear cover plate 704 and engage with matching, upwardly extending L-plate lugs 730 and 729 respectively on the rear plate 734 for firm yet readily releasable support of front control assembly 705 on back support assembly 703. The lugs 731 and 732 are resilient and may be moved upward for ready removal of the front control assembly unit 705 from the rear support assembly 703.

The apparatus 700 operates the relays of the power units of the heating, ventilating and air conditioning systems as 12, 511 and 13 in such a fashion as to produce a higher probability of acceptable thermal comfort to the occupants as 60 of the conditioned space 16 than is possible with traditional wall mounted thermostats while following specific programs which minimize utility power consumption necessary to maintain the conditioned space at these acceptable comfort conditions.

The control procedures of apparatus 700 are based upon research in thermal comfort as summarized in the Comfort Equations of ASHRAE Standard 55-1981. The procedures of apparatus account for the six parameters as outlined in the ASHRAE Comfort Equations, specifically, dry bulb temperature (tdb), mean radiant temperature (MRT), air velocity (V), relative humidity (rh), clothing factor (clo), and metabolic rate (M). In addition to these six parameters, the procedures incorporate an adaptive response to the six variables over time (t) to create a dynamic operating system. The inclusion of time as an element in the procedures makes possible a control technique which maintains the conditioned space within an operator specified Operative Temperature (To) range with minimal running time of heating, ventilating and air conditioning system operation and, hence, minimal utility cost.

The controlled variable in each space as 16, known more accurately as pseudo-operative temperature (To), is measured directly by the apparatus 700. To is a function of the ambient dry bulb temperature (tdb), the ambient mean radiant temperature (MRT), and the air velocity (V) in space 16. This is accomplished with a temperature sensitive electronic sensor device 406 affixed to a thermal mass 463 exposed directly to the air currents and radiant heat of the conditioned space 16. The mass to surface area ratio of the temperature sensor is critical for providing proper compensation of the convective heat exchange coefficient (hc) due to air velocity in the conditioned space. The material chosen for the surface of the thermal mass, gold, absorbs radiant energy at frequencies typical for such conditioned spaces at rates similar to the absorption rate of the human body.

Two parameters in the Comfort Equations, clothing factor (clo) and metabolic rate (M), are treated as constant values for presetting neutral/comfort set points with temperature ramps for subsequent variations by the operation of apparatus 700 and system 707. The actual set points are dynamic and the beginning preset comfort set point values selected will generally correspond to lightly dressed adults performing sedentary work. Relative humidity (rh) is neither monitored directly, nor treated as a constant in the apparatus 700, but in instead indirectly incorporated in the dehumidifying-/Effective Temperature (ET) shift and the rates of pseudo-operative temperature change allowed in the typical cooling operation.

There are adjustable rheostats and associated electrical circuiting for setting each of two Operator Adjustable Comfort Set Points (Ts), rheostate 417 for Comfort Set Point—Heat (TSH) and rheostat 416 for Comfort Set Point—Cool (TSC), two Operator Adjustable Drift Limits, rheostate 418 for Drift Limit—Heat (TLH) and 524 Drift Limit—Cool (TLC), and rheostate 525 for Operator Adjustable Hold Time (HT).

As shown in FIG. XLII each rheostat as 524 has a dial as 740 with a pointer or indicator 741 and slot 742. The same structure is provided for the rheostats 416, 417, 418 and 525. Adjacent to each such indicator as 741 is a set of the numbers indicating the temperatures as 75, 80, 85, 90 and 95 for dial 740 and numbers 55, 60, 65, 70 and 75 for dial 418 and numbers 65, 70, 75, 80 and 85 for dial 417 and numers 65, 70, 75, 80, and 85 for dial 416. These indicate the temperatures, respectively, for the set points for heating on dial 417 and cooling on dial 416, for drift limit during heating on dial 418, and for the drift limit on cooling on dial 524. Also the hold time rheostat 525 has a dial as provided with an indicator for the operation of rheostat 252 to indicate the number of hours which may be set by the operator e.g. 0.5, 2.0, 3.5, 5.0, 6.5 and 8 hours. A setting tool 756 is held in brackets 754 and 755 and has blades 757 and 759. The blades 757 and 759 fit into the slots at 742 one each of the dials 416, 417, 418, 524 and 525 to provide for convenient setting of such dials by locating the indicator on such dial adjacent to the temperature value desired therefor and shown on the calibrated scale provided on the back of the plate 708 and exposed when assembly 705 is removed from assembly 703. The blade 757 and 759 are made sufficiently brittle so that they will break when the rheostat is 524 is attempted to be turned past its maximum clockwise or past its maximum counter clockwise position and so protects such rheostat and all the other rheostat dial faces which are exposed on face 708 of unit 705 from mechanical damage by any attempt to turn such dials past their intended maximum and minimum position.

Table IV illustrates the various modes of operations of the apparatus 700 as determined by the operator touching the plate 463 in the sequence set out in that Table are below described.

The Dynamic Set Points (To) coincide with the Operator Adjustable Comfort Set Points (Ts) at the beginning of an Operating Mode 0 or 1. Over time, the value of the Dynamic Set Points (To) will exist at various settings along a timetemperature ramp between the comfort set points (Ts) and the drift limits (TL). The ramp movement of the Dynamic Set Points (To) from Comfort Set Point values (Ts) to the drift limit values (TL) is in small incremental steps (0.17 deg F., 0.09 deg C.) increments each ten minutes so as to closely approach a smooth uniform movement unnoticeable to occupants. The set of programs includes a low limit set point stop (45 F.) and a high limit set point stop (95 F.) for interior space protection, and these limits come into action if the unit has been turned off (Mode 4) and wide temperature variations occur.

The procedure provided by apparatus 700 includes an automatic measure of the pseudo-operative control point temperatures, and then a comparison of this value with the values of two specific (dynamic) set points. The specific values of the Dynamic Set Points is a function of both time and previous operator input history by operation on plate 463. The result of these comparisons decides the ensuing action taken by the apparatus 700. Detection by sensor 406 of a pseudo-operative control point temperature above or below the dead band bounded by the dynamic set points initially, in mode 0 or 1, set at rheostats 416 and 417 and plate 463 will initiate a commande for either cooling or heating to maintain the conditioned space 16 within the limits defined by the positions of the two dynamic set points.

Hold Time is an operator controlled value at rheostat 525 which is initially set by the operator at rheostat 525 to provide a period for the occupant's body to become accustomed to the heat exchange rates with the controlled environment and for the heat exchange rates of space enclosure and contents to stabilize. The Hold Time function begins timing either when the pseudo-operative temperature achieves a value within the range defined by the two comfort set points or when the operator initiates a Mode 2 or Mode 3 operation. The Hold Time function becomes engaged whenever the control point reaches a value equal to one of the two dynamic set points. The set point ramp functions commence operation any time the Hold Time function expires or is operator terminated. The ramp functions by increasing and decreasing the dynamic set points for cooling and heating, respectively, over time. During heating mode the Control Point is smoothly and continuously decreased at a rate of one degree F. per hour from the initial value each hour when the ramp function is operating. During cooling mode the Control Point—is smoothly and continuously increased from the initial value at a rate of one degree F. per hour when the apparatus is in Mode 0, 1, or 6 while the ramp function is operating and, during Mode 2 is increased at rates of 0.25 degree F. per hour when the air conditioner compressor is not running and of 1.0 degree F. per hour when the compressor is in operation as shown in FIG. XXXIX. No drift may occur while heating and cooling are inactive as in FIG. XXXVIII.

The components of assembly 400 compare the pseudo-operative temperature control point value to the Dynamic Set Point values and automatically initiates the appropriate action such as: energizes the cooling system, energizes the heating system, or takes no action. Energizing either of the heating or cooling systems also sets a 24-hour inhibition on the other system and regulates automatic changeovers between heating and cooling to a maximum of one per day unless manually requested. This avoids the wasteful situation of slightly heating followed by cooling during mild weather conditions.

The controller assembly 400 also incorporates a set point control differential procedure. The Set Point Differential procedure provided for generally varies the temperature differential or band width between on and off commands and specifically provides for band width values ranging from one degree F. to one-half degree F. inhibited only by program safeguards for assuring that the motors for the cooling compressor stay off and on for minimum periods to prevent otherwise harmful short-time-cycling of the HVAC system when such system has capacity for quick recovery to set point or the system load is very light. The temperature set point differential procedure is illustrated in FIG. XL and XLI; as there shown the band is progressively narrowed from an initial value of 1.0 F. to a final value of 0.5 F. as the length of time between compressor off commands grows, allowing accurate and close range temperature control under high load conditions without creating short period cycling conditions under light load situations. Additional short cycle protection is included in the program in the form of a 5-minute minimum off-time for the compressor when it is automatically stopped by the apparatus 700 and a 7-minute minimum on-time for the compressor when it is automatically started by the apparatus 700.

In FIG. XXXVII to XLI time is shown along the horizontal axis from left to right and temperature is shown along the vertical axis.

FIG. XXXVII shows a usual drift situation where a hold time starts at time point 762 and extends to time 763; the set point changes at the rate of 1 F. per hour to the time point 764 at which temperature level the drift limit is established or had been established and continues at the temperature between 764 and 765. In this operation the temperature of zone as 16 which initially is at the value of 762 and 763 for the period of time between 762 and 763 may then change as shown by the dashed line 766 and never reaches the limit 764 and 765; this is merely a drift, there has been no change forced on the environment as in 16 to reduce the temperature therof.

In FIG. XXXVIII where there is an initial hold time from point 767A in time to point 767B in time and at the level of temperature shown as 767; the set point thereafter changes along the sloped line 768 towards the upper level 769. The maximum slope of the temperature change along line 768 is 1 F. per hour and the limit is at 769. The range or band in this case is the distance 778 between levels 777 and 769 (767A and B and 777 are the same temperature level).

In this Figure of the horizontal lines shown as 771 and 773 and 775 represent a 0 deg F. per hour ramp with the compressor in its off position while the sloped lines 772, 774 and 776 and the period between 767A and 770 represent 1 F. per hour while the compressor is on so that there are several steps within the band 778.

In FIG. XXXIX the hold time from 780 to 781 is followed by a period from 781 to 782 along the 1 deg F./hr sloped line 783 in the direction toward point 784 at the initiation of a period of temperature shown as 785. However the steps by which the temperature is changed is only by a 1 per F. hour drift ramp while the compressor is on shown at periods 781–782, 787 and 890 with intermediate periods 786, 788 and 892 of 0.25 F. per hour ramp while the compressor is off.

In FIG. XL the variation of range of band width is shown with the heating actuator on and off conditions during a heating mode. The curved line 790 has several segments the position of which vary in location between the on and off condition used to keep the temperature of zone as 16 within the band. The temperature curve changes from the level of 791 to the level shown as 804 which is a 1 F. change in this illustration; when the temperature reaches point 805 at the level 804 then the heating mode starts and the zone temperature rises as along segment 806. After a period of 12 minutes between time and temperature point 791 and 792 and after each subsequent 3 minute period as from 792 to 793 without an "off" signal the upper temperature limit of the band 804–791 is changed by apparatus 400 from time 792 to 798 i.e. for 1/6 F.; each additional 3 minutes period of time between off conditions, as from 793 to 795 provides a additional drop of 1/6 of a degree F. (as the increment 794 between level 798 and level shown as 792 and the drop 797 from the level shown as 798 to the level shown as 800.) Further fall in band limit temperature as shown at 801 down to level 802 occurs until the sensed temperature as at portion 803 is met for an "off" signal. When the temperature, as shown at 803 finally meets and upper band limit setting as 802 then the heating operation is turned off. At that point the set point immediately goes back to the level 810 (same as 791–792).

In FIG. XLI the variation of range of band width is shown with the cooling relay on and off conditions during a cooling mode. The curved line 820 has several segments the portions of which vary in location between the on and off condition used to keep the temperature of zone as 16 within the band. The temperature curve changes from the level of 821 to the level shown as 834 which is a 1 F. change in this illustration; when the temperature reaches point 835 at the level 834 then the cooling mode starts and the zone temperature falls as along segment 836. After a period of 12 minutes between time and temperature point 851 and 822 and after each subsequent 3 minute period as from 822 to 827 without an "off" signal the temperature range of the band lower limit is changed by assembly 400 from 821 to 828 i.e. for 1/6 F.; each additional 3 minutes period of time between "off" signals as from 827 to 831 provides a additional rise of 1/6 of a degree F. as the increment 827 between level 828 and level shown as 830 and the rise from the level shown as 830 to the level shown as 832. Further, a rise in band limit temperature as shown in 830 up to level 832 occurs until the sensed temperature as at portion 833 is met for an "off" signal. When the temperature, as shown at 833 meets lower band limit setting as 832 then the cooling operation is turned off. At that point the set point immediately goes back to the level 840 (same as 851–822).

For FIG. XLI following the exemplary level of the off temperature being set at level 840 for period of 12 minutes until the time 841 the temperature in the zone 16 may then rise along the portion 842 until the level intersects the temperature set for putting the cooling equipment again into operation at 843 following which the curve 820 moves down along the portion 843–848. However where the temperature does not reach the off level as 840 until after a period of 12 minutes the "off" set point again automatically reduces first to the level 845 and then to the level 846 each following 7 minute period as at time indicated at 841 following the 12 minutes between 833 and 841 and each subsequent 3 minutes as between time 841 and 844. When the temperature as shown by 848 again intersects the set point level, this time at level 846 the cooling relay is turned off and the temperature in the zone 16 returns along the line 847 and the set point temperature again lowers to the level of 849 which is the same as was the level at point 821 and 840.

For FIG. XL following the exemplary level of the off temperature being set at level 810 for period of 12 minutes until the time 811 the temperature in the zone 16 may then fall along the portion 812 until the level intersects the temperature set for putting the heating equipment again into operation at 813 following which the curve 790 moves up along the portion 813-818. However where the temperature does not reach the off level as 810 until after a period of 12 minutes (between time 796 and 811) the "off" set point again automatically reduces first to the level 815 and then to the level 816 each following 3 minute period as at time indicated at 811 following the 12 minutes between 796 and 811 and each subsequent 3 minutes as between time 811 and 814. When the temperature as shown by 818 again intersects the set point level, this time at level 816 the heating goes off and the temperature in the zone returns along the zone 817 and the set point temperature again rises to the level of 819 as was the level at 810 and in period 791-792.

As shown in Table IV there are seven operator selectable operation modes numbered 0 through 6 with apparatus 700 and each mode is further modifiable by operator selected options. All operator mode selection and mode option modification are made by the operator touching the touchplate 463 (which plate 463 also serves as the thermal mass unit for the pseudo-operative temperature sensor). While the sensor touchplate 463 is being used as the operator input key, the pseudo-operative temperature readings are ignored by the microcomputer assembly 400 until the plate 463 has had time to dissipate heat gained from the operator's touch or recover from heat lost from the operator's touch. Visual indication to the operator of the mode selection is with a LED 566 located on the face 711 of the apparatus 700.

Mode 0 resets the Dynamic Heating and Cooling Set Points at values equal to the predetermined Comfort Set Point values and maintains this condition for the length of time as determined by the HVAC system's capability to bring the environmental space as 16 under control and the Hold Time Setting provided by rheostat 525. The Hold Time period commences when space 16 conditions, as determined by sensing pseudo-operative temperature therof reach the comfort set point, and the HVAC unit then turns off, and the ramp function as in FIGS. VI or VII commences at the end of the Hold Time function. The operator may, in Mode 0 only, temporarily modify the length of time the Hold Time function operates by making subsequent and immediate additional touches to the touchplate. The LED 638 then automatically provides visual feedback to the operator, by flashes seen through window 566 as in Table IV, for verifying acceptance of additional mode option touches.

Mode 1 also resets the Dynamic Set Points at values equal to the predetermined comfort set points. The operator may modify (through subsequent and additional touches within 2 seconds of setting of the mode) the length of time the ramp functions will operate after the preset Hold Time has expired, by specifying the length of the period of time at the end of which period the Dynamic Set Points shall again be reset to values equal to the Comfort Set Points.

Mode 2 sets the Dynamic Cooling Set Point to a value of one degree less than the pseudo-operative control point temperature and immediately engages the Hold Time function. By subsequent and immediate additional touches the operator may, as a mode modification, set the Dynamic Set Point at values of more than one degree below the pseudo-operative temperature in increments of 1 deg F.

Mode 3 automatically sets the Dynamic Heating Set Point to a value of one degree greater than the pseudo-operative control point temperature and immediately engages the Hold Time function. Further touches modify the mode to set the dynamic heating set point at values of more than one degree above the pseudo-operative temperature.

Mode 4 positions the Dynamic Heating and cooling set points at 45 deg F. and 95 deg F., respectively, resets any Mode 5 operation to the automatic default value, and thus effectively turns the HVAC system off in other than extremely hot or cold inside space conditions. Mode 4 also clears any inhibition regulating automatic changeovers between heating and cooling, making possible an immediate, operator-initiated changeover. Modification of this mode (4) through mode options later restores the Dynamic Set Points to values equal to the operator predetermined comfort set point values after the passage of a length of time selected from the operator's mode option touches.

Mode 5 controls operation of the HVAC system fan, with the default condition activating the fan only when either the heating or cooling systems are energized. This mode may also be modified by mode option touches to operate the fan continuously or for operator selectable proportional lengths of time out of a repeating 15-minute cycle. Mode 5 overlays all other modes and operates continuously with all other modes except Mode 4. Moreover, fan operation is continued for a fixed time period such as two minutes to capture residual cooling capacity, the system following operation of the cooling system then otherwise inhibits fan operation for a fixed time to provide time for condensed water drainage. Fan operation otherwise re-evaporates the condensate residue on the cooling coil and in the drain pan causing a rise in relative humidity.

Mode 6 terminates the Hold Time function and, immediately energizes the ramp functions and sets the values of the appropriate Dynamic Set Point one degree beyond the pseudo-operative temperature. The option mode allows restoring the Dynamic Set Points to predetermined comfort set points after a delay time selected by the operator.

The programs of apparatus 700 are accomplished with a microelectronic computer, analog to digital converters, and various supporting electronic circuits as in FIGS. XXXII-XXXV. The operator predetermined values (for Comfort Set Point—Heat, Comfort Set Point—Cool, Drift Limit—Heat, Drift Limit—Cool, and Hold time) are set on the precision potentiometers using a tool therefor, 756, stored within the casings 702 and 704. The analog values as set are read by the computer assembly 400 through analog-to-digital converters. A default value for the dynamic heating set point of one degree less than the dynamic cooling set point operates whenever there would otherwise exist a noncontrollable overlap of the two dynamic set points. The computer assembly 400 scans and performs the process repeatedly, makes control decisions, and executes these control decisions by driving the triac circuits thereof in FIG. XXXIV in a binary fashion; alternatively a proportional (as a pulse width modulated fashion) is used in accordance with a proportional-integral-derivative control program. The triac circuits control the operation of the fan, the cooling system, and the heating system by means of low voltage relays, solenoids, or actuator motors common to HVAC systems: a selectable jumper network shown in FIG. XLII allows fitting the apparatus 700 timing and anticipating programmed circuits to direct expansion cooling or hydrocarbon fired heating systems (jumpers as 746 and 747 at position 2 and 4 of FIG. XLII on exposed terminals of terminal strip 744), direct expansion cooling-electric heating systems jumpers at 1 and 4, heat pump systems diverted for heating jumpers at 1 and 3 and heat pump systems diverted for cooling (jumpers at 2 and 3).

Operations of the programs or process cycles of unit 700 in system 707 may be interrupted either by the operator or by an input at special interrupt remote terminals 497 and 503 responsive to a remote sensor. Also, unit 700 may be interrogated when connected by terminals 468 and 477, which terminals are connected to pin connections 467 and 476 in strip 716. Terminals 497 and 503 provide communication for transmitting information from apparatus 400 for remote control. Operator interruption is routinely accomplished by touching the touchplate 463. A circuit sensitive to changes in capacitance (part A' of FIG. XXXIII) detects the touch and switches the programmed components of apparatus 400 to a selection which, in turn, presents each possible mode to the operator. When the desired mode is displayed (at window 566 for LED 638) the operator releases his touch at plate 463. The circuit assembly 400 also responds to any subsequent mode modifying touches as in Table IV following the touch signal first initiated within a modification period two seconds after the first touch. Presence of a signal at the special load shed interrupt terminal immediately engages a cyclical load shedding operation; the set points are not effected by the load shed function. This load shed interrupt may be employed as at 482 and 491 of FIG. XXIII in connection with power meter interface equipment or with utility load shedding equipment.

Cost comparison based on metered data of an existing 2100 square foot residence in Houston, Tex. for a 3 year test period with 2 adults and 3 small children residing in a residence occupied 24 hour per day, with natural gas at $6.00/MCF for domestic hot water and space heat using a 96,000 B.T.V. capacity Carrier model 58CH12032 heater and cooling by conventional electrical air conditioner (4 ton capacity General Electric model BTR4883) at $0.09/KWH with temperature settings before apparatus 700 was installed of 70 F. heating and 78 F. cooling provides 46 percent savings on electric cooling portion with apparatus 700 and 37 percent savings on gas heating portion with apparatus 700 installed. Similar savings resulted with an all-electric apartment based on actual test results for 1981-1983.

The overall dimensions of apparatus 700 (shown to scale and pictorially in FIGS. XIX and XXI and XXII are; overall height 5 inch, (12.6 cm); overall width (left to right) 7 inch, (17.7 cm); touch plate 463 height exposed 1⅜ inch (3.7 cm) and width exposed is 3⅞ inch (4.6 cm). The weight of the touch plate 463 is 0.91 ounces (25.9 grams).

Table III and Table IV follow.

The CMOS EPROM 462 is an off the shelf available unit and is programmed in conventional manner by a program as set out in the hereto attached print out sheets 1-34 THERMP on a standard 5¼ inch diameter floppy disc using a conventionally available Motorola ® MC6800 64K RAM development system. Sheets 1-34 THERMP follow page 72 hereof.

The secondary (24 volt) winding 643 of transformer 515 is connected in series via terminal 432 in strip or block 706 and pin 635 in plug assembly 716 as shown in FIG. XXIII and XXI through diodes triacs and power circuit of FIG. XXXIV and via terminals 553, 552 and 433 in terminal block or strip 706 and pins 641, 640 and 639 of plug assembly 716 to heating relay 14, cooling relay 15 and fan relay 510 respectively; thereby no independent power supply to unit 400 is required as the transformer for said relays provides power to unit 400 through the same conductors as power the relays as shown in full lines in FIG. XXIII.

The touch plate 463 is made of gold plated brass, 0.20 total inch thick, with a coating of 200 microinch of nickel plate, and with 50 microinch of surface gold plate thereon. Where the system has separate transformers for the heating relay, fan relay and cooling relay, each such transformer as 516 may be connected to the unit 400 as shown for transformer 515 in FIG. XXIII, i.e. one end of the transformer secondary coil, (as 643 of 515) is connected to terminal 432 and the other end of that secondary coil of each such transformer is separately connected to the end terminal as 771, 772 and 773 (of heating, cooling and fan relay) distant from the terminals 553, 552 and 433 respectively; in such arrangement of separate transformers as 516 for each relay as 14 (and a like transformer for relay 15 and 510) lines 774, 775, 776 and 749 are deleted. In the schematic FIG. 1, ground symbol is shown to indicate the neutral conductor rather than only a ground as known in D.C. Systems.

TABLE III

| | ELECTRICAL ITEMS SHOWN IN DRAWING |
|---|---|
| 401 | Bus Multiplexer - CMOS, MSI dual 4 kit latch Motorola MC14508B |
| 402 | CMOS EPROM - ultra violet erasable (MOS PROM, 32K electrically reprogrammable CMOS EPROM National Semiconductor NMC27C32 |
| 403 | Microprocessor - Motorola MC146805E2 8 bit microprocessor contains CPU, on chip RAM 112 bytes 8 bit timer 16 bidirectional I/O lines |
| 404 | 3-in Nand Gate - CMOS, SS1 triple 3 input NAND gate Motorola MC14023B |
| 405 | 3-in Nand Gate - CMOS, SS1 triple 3 input NAND gate Motorola MC14023B |
| 406 | 20K PA42D1 - Thermistor |
| 407 | 150K - Resistor |
| 408 | .1 uf C323C10425V1CA - Capacitor |
| 409 | 10K - Resistor |
| 410 | 22K - Resistor |
| 411 | 10K - Resistor |
| 412 | .1 uf C323C10425V1CA - Capacitor |
| 413 | 10K - Resistor |
| 414 | 15K - Resistor |
| 415 | 10K 3299X-1-103 - Potentiometer |
| 416 | 50K 3345P1-503 - Potentiometer |
| 417 | 50K 3345P1-503 - Potentiometer |
| 418 | 50K 3345P1-503 - Potentiometer |
| 419 | A/D Converter - CMOS, SS1 Motorola MC14443P 6 channel, single slope, 8 bit, analog to digital converter |
| 420 | 47K - Resistor |
| 421 | 4.7K - Resistor |
| 422 | 22K - Resistor |
| 423 | MPS A92 - NPN Transistor |
| 424 | 1N 4749 - Diode 24 VZ |
| 425 | 100 uf 25 V VTL100S25 - Capacitor |
| 426 | 4.7K - Resistor |
| 427 | 4.7K - Resistor |
| 428 | 4.7K - Resistor |
| 429 | 120 - Resistor |
| 430 | 120 - Resistor |

TABLE III-continued
ELECTRICAL ITEMS SHOWN IN DRAWING

| | |
|---|---|
| 431 | 120 - Resistor |
| 432 | 7th Pos. SSB4S10S - Terminal Block |
| 433 | 10th Pos. SSB4S10S - Terminal Block |
| 434 | .1 uf C323C10425V1CA - Capacitor |
| 435 | .1 uf C323C10425V1CA - Capacitor |
| 436 | .1 uf C323C10425V1CA - Capacitor |
| 437 | 2N6070B - Triac |
| 438 | 1.2K - RESISTOR |
| 439 | 2N6070B - Triac |
| 440 | 2N6070B - Triac |
| 441 | 22K - Resistor |
| 442 | 4.7K - Resistor |
| 443 | 4.7K - Resistor |
| 444 | PN2222A - NPN Transistor |
| 445 | 22K - Resistor |
| 446 | PN 2907A - PNP Transistor |
| 447 | 2N5551 - PNP Transistor |
| 448 | 390 - Resistor |
| 449 | 1.2K - Resistor |
| 450 | 1.2K Resistor |
| 451 | 10 M - Resistor |
| 452 | MP040 - Crystal - 4 MHZ |
| 453 | 22Pf - CK05BX220M - Capacitor |
| 454 | 22Pf - CK05BX220M - Capacitor |
| 455 | Flip Flop - CMOS, SS1 dual type-D flip flop Motorola MC14013B |
| 456 | 3-in Nand Gate - CMOS, SSI triple 3 input NAND gate Motorola MC14023B |
| 457 | 2.2K - Resistor |
| 458 | 1N4154 - Diode |
| 459 | 1.8K - Resistor |
| 460 | Touch Plate - Solder Pad |
| 461 | .1 uf C323C10425V1CA - Optional Capacitor |
| 462 | 1N4154 - Diode |
| 463 | Touch Plate |
| 464 | 22K - Resistor |
| 465 | 220K - Resistor |
| 466 | 1N4002 - Diode 1A-100V |
| 467 | 09-64-1103 - I/O Connector Male |
| 468 | 3rd Pos. SSBS10S - Terminal Block |
| 469 | MC3302 - Quad Camparator |
| 470 | 4N33 Opto Isolator |
| 471 | 220K - Resistor |
| 472 | 220K - Resistor |
| 473 | 22K - Resistor |
| 474 | 1 M - Resistor |
| 475 | 1.2K - Resistor |
| 476 | 09-64-1103 - I/O Connector Male |
| 477 | 4th Pos. SSB4S1OS - Terminal Block |
| 478 | 22K - Resistor |
| 479 | 220K - Resistor |
| 480 | 1N4002 - Diode 1A-100V |
| 481 | 09-64-1103 - I/O Connector Male |
| 482 | 1st Pos. SSB4S10S - Terminal Block |
| 483 | Quad single supply comparator Motorola MC3302P |
| 484 | 4N33 - Opto Isolator |
| 485 | 220K - Resistor |
| 486 | 220K - Resistor |
| 487 | 22K - Resistor |
| 488 | 1 M - Resistor |
| 489 | 1.2K - Resistor |
| 490 | 09-64-1103 - I/O Connector Male |
| 491 | 2nd Pos. SSB4S10S - Terminal Block |
| 492 | 22K - Resistor |
| 493 | 10K - Resistor |
| 494 | 4N33 - Opto Isolator |
| 495 | 1N4749 - Diode 24 VZ |
| 496 | 09-64-1103 - I/O Connector Male |
| 497 | 6th Pos. SSB4S10S - Terminal Block |
| 498 | 4.7K - Resistor |
| 499 | 10K - Resistor |
| 500 | 1 M - Resistor |
| 501 | 1.2K - Resistor |
| 502 | 09-64-1103 - I/O Connector Male |
| 503 | 5th Pos. SSB4S10S - Terminal Block |
| 521 | 47K - Resistor |
| 522 | 47K - Resistor |
| 523 | 47K - Resistor |
| 524 | 50K 3345P1-503 - Potentiometer |
| 525 | 50K 3345P1-503 - Potentiometer |
| 526 | 1.0 uf 25 V VLB1H010M - Capacitor |
| 527 | .01 uf CK05BX103 - Capacitor |
| 528 | 3.3K - Resistor |
| 529 | 2.7K - Resistor |
| 530 | .1 uf C323C10425V1CA - Capacitor |
| 531 | 100K 3299X-1-104 - Potentiometer |
| 532 | 100K - Resistor |
| 551 | 1N4002 - Didode 1A-100V |
| 552 | 9th Pos. SSB4S10S - Terminal Block |
| 553 | 8th Pos. SSB4S10S - Terminal Block |
| 554 | 1N4002 - Diode 1A-100V |
| 555 | 2N5551 - PNP Transistor |
| 556 | 4.7K - Resistor |
| 557 | 1N4002 - Diode 1A-100V |
| 558 | 22K - Resistor |
| 559 | 47K - Resistor |
| 560 | 1.0 uf 25 V ULB1H010M - Capacitor |
| 561 | .1 uf C323C10425V1CA - Capacitor |
| 562 | Opptional - Diode |
| 563 | 5VDC UA7905UC - Voltage Regulator |
| 564 | 31201.5 - Fuse-3AG 1.5A |
| 565 | 22K - Resistor |
| 566 | 220K - Resistor |
| 567 | 22K - Resistor |
| 568 | Quad Single Supply comparator Motorola MC3302P |
| 569 | 22K - Resistor |
| 570 | 1N4002 - Diode 1A-100V |
| 571 | 82K - Resistor |
| 572 | 47K - Resistor |
| 573 | 47K - Resistor |
| 574 | 47K - Resistor |
| 575 | 47K - Resistor |
| 576 | 47K - Resistor |
| 577 | 47K - Resistor |
| 578 | Quad single supply comparator Motorola MC3302P |
| 579 | Quad single supply comparator Motorola MC3302P |
| 580 | Quad single supply comparator Motorola MC3302P |
| 581 | 1N4002 - Diode 1A-100V |
| 582 | 22K - Resistor |
| 583 | 68K - Resistor |
| 584 | 39K - Resistor |
| 585 | 22K - Resistor |
| 586 | 100K - Resistor |
| 587 | 22K - Resistor |
| 588 | .001 uf GE102 - Capacitor |
| 589 | V56ZA2 - Mov |
| 591 | Quad single supply comparator Motorola MC3302P |
| 590 | 100K - Resistor |
| 594 | 100K - Resistor |
| 595 | 9 Quad single supply comparator Motorola MC3302P |
| 593 | 1N4002 - Diode 1A-100V |
| 596 | 1N4002 - Diode 1A-100V |
| 592 | 22K - Resistor |
| 600 | V56ZA2 - Mov |
| 599 | .001 uf GE102 - Capacitor |
| 598 | MC3302 - Quad Comparator - 9 |
| 597 | 22K - Resistor |
| 609 | 22K - Resistor |
| 601 | 22K - Resistor |
| 602 | 22K - Resistor |
| 603 | 1N4002 - Diode 1A-100V |
| 604 | 100K - Resistor |
| 605 | 1N4002 - Diode 1A-100V |
| 606 | 22K - Resistor |
| 607 | Quad single supply comparator Motorola MC3302P |
| 608 | .1 uf C323C10425V1CA - Capacitor |
| 610 | V56ZA2 - Mov |
| 611 | .001 uf GE102 - Capacitor |
| 612 | 22K - Resistor |
| 613 | Quad single supply comparator Motorola MC3302P |
| 614 | Quad single supply comparator Motorola MC3302P |
| 615 | 1N4002 - Diode 1A-100V |

TABLE III-continued

ELECTRICAL ITEMS SHOWN IN DRAWING

| | |
|---|---|
| 616 | 100K - Resistor |
| 617 | 1N4002 - Diode 1A-100V |
| 618 | 22K - Resistor |
| 619 | .1 uf C323C10425VICA - Capacitor |
| 627A | 100K - Resistor |
| 628B | .1 uf - Capacitor |
| 629C | Wire Connections for Thermistor |
| 630D | Transistor PN2222 |
| 631E | 65610-172 - Jumper Strip |
| 632F | .1 uf - Capacitor |
| 633G | .1 uf - Capacitor |
| 634H | Fuse Holder |
| 635I | I/O Connector - Female |
| 636J | PN2222 - Transistor |
| 637K | PN2907 - Transistor |
| 638L | CQV61J - L.E.D. |

(In the above table u = micro)

TABLE IV

OPERATING MODES*

| PART I: MODE SELECTION Determined by duration of first touch measured by number of winks | | PART II: MODE OPTIONS Determined by number of additional touches | |
|---|---|---|---|
| No. of Winks | Mode Description | No. of Touches | Mode Description |
| 0 ** | RESET: to neutral/comfort set points. Drift begins after preset hold time. | Any Number to 127 | Drift begins after hold time which is determined by number of touches (one hour/touch). |
| 1 ** | RESET: To neutral/comfort set points. Drift begins after preset hold time. | Any Number to 127 | Reset automatically occurs after period determined by number of touches (one hour/touch). |
| 2 *** | COOLER: Lowers cooling set point 1 F. below ambient temperature and drift begins after hold time. | Any Number to 4 | Lowers cooling set point an additional 1 F. below ambient temperature for each touch. |
| 3 *** | WARMER: Raises heating set point 1 F. above ambient temperature and drift begins after hold time. | Any Number to 4 | Raises heating set point an additional 1 F. above ambient temperature for each touch. |
| 4 | OFF: Heating and cooling set points positioned at 45 F. and 95 F. respectively. | Any Number to 127 | Reset automatically occurs after period determined by number of touches (one hour/touch). |
| 5 | FAN: Puts fan in "AUTO" mode activated only by cooling and heating cycles as selected Note: Previous settings are not cancelled. | 1 | ON: Fan runs continuously. |
| | | Any Number 2 to 13 | CYCLE: Fan cycles on a portion of each 15 minute period. The "ON" duration is equal is equal to one min./touch. |
| 6 | DRIFT: Cooling and heating set points positioned at 1 F. above and below ambient temperature respectively causing cooling or heating to cease and drift to | Any Number to 127 | Reset automatically occurs after period determined by number of touches (one hour/touch). |

TABLE IV-continued

OPERATING MODES* begin immediately.

*Delay between mode selection and mode option touches must be less than 2 seconds or TOUCHSTAT will assume entry has been completed.
**Hold time begins after ambient temperature reaches set point.
***Hold time begins immediately. Drift rate in mode 2 changes to .25 F/HR at times cooling as cycled off.

I claim:

1. A demand responsive process for controlled heating and cooling of an occupied area of a building for human habitation, said process comprising:

(a) selectively activating a desired initial comfort temperature setting for said occupied area via a random and non-repeating operator input command;

(b) sensing said temperature of said occupied area and providing an output signal functionally related to said temperature within said occupied area;

(c) automatically activating heating and/or cooling units in response to said output signal and said initial comfort temperature setting to maintain said temperature at approximately said desired initial comfort temperature setting during at least a predetermined first period of time;

(d) thereafter automatically altering said desired temperature setting as a function of time and in an energy conserving direction during a second period of time of a duration of at least several hours and at a predetermined temperature ramp rate equal to or less than approximately 1° F. per hour;

(e) automatically activating said heating and/or cooling units in response to said output signal and said altered temperature setting to maintain space temperature at approximately said altered temperature setting during at least said second period of time;

(f) thereafter repeatedly activating a selected comfort temperature setting for said occupied area via additional random and non-repeating operator input commands;

(g) automatically activating said heating and/or cooling units in response to said output signal and said selected comfort temperature setting to maintain said temperature at approximately said selected comfort temperature setting during at least a predetermined third period of time;

(h) thereafter automatically altering said selected comfort temperature setting as a function of time and in an energy conserving direction at a predetermined temperature ramp rate equal to or less than approximately 1° F. per hour;

(i) automatically activating said heating and/or cooling units in response to said output signal and said altered selected temperature setting to maintain said temperature at approximately said altered selected temperature setting; and (j) automatically prohibiting alteration of said desired temperature setting and said selected temperature setting beyond a desired final comfort temperature setting.

2. The process as defined in claim 1, wherein said operator input command occurs substantially simultaneously with said activation of said selected comfort temperature setting.

3. The process as defined in claim 1, wherein said desired temperature setting is altered during said second period of time in accordance with pre-programmed commands.

4. The process as defined in claim 1, wherein said first period of time is one-half hour or more.

5. The process as defined in claim 1, wherein said first period of time is selectively adjustable by occupants within said building.

6. The process as defined in claim 1, wherein said first period of time commences when said temperature reaches said desired initial comfort temperature setting.

7. The process as defined in claim 1, wherein said first period of time commences when heating and/or cooling units are activated.

8. The process as defined in claim 1, wherein said output signal is functionally related to dry bulb temperature, ambient room temperature, and air velocity within said occupied area.

9. Apparatus for space temperature control of an occupied building, including heating means and control means for actuating said heating means, said control means comprising;
    thermal sensing means for providing an output signal functionally related to temperature within said occupied building;
    temperature setting means for setting a desired initial comfort temperature setting and a desired final comfort temperature setting at which said heating means is activated and deactivated;
    setting change means for automatically changing temperature settings at which said heating means is activated and deactivated during a period of time of at least several hours, said changing of said temperature settings from said desired initial comfort temperature setting being in an energy conserving direction and said changing being at a temperature ramp rate of no more than approximately 1° F. per hour;
    reset means for automatically resetting said temperature setting at said initial comfort temperature setting in response to randomly timed operator input commands;
    said setting change means automatically changing said reset temperature setting in an energy conserving direction and at a selected ramp rate of no more than approximately 1° F. per hour;
    limit means for limiting changing of temperature settings to a value representative of said desired final comfort temperature setting; and
    said control means automatically activating said heating means in response to said thermal sensing means output signal and said temperature settings.

10. The apparatus as defined in claim 9, further comprising:
    time set means for setting a first period of time during which said heating means is automatically activated for maintaining said temperature at approximately said initial comfort temperature setting.

11. The apparatus as defined in claim 10, further comprising:
    means for selectively adjusting said first period of time in response to interaction by occupants within said building.

12. The apparatus as defined in claim 11, wherein said first period of time is one-half hour or more.

13. The apparatus as defined in claim 9, further comprising:
    means for selectively adjusting said temperature ramp rate in response to interaction by occupants within said building.

14. The apparatus as defined in claim 10, wherein said first period of time commences when said space temperature reaches said desired initial comfort temperature setting.

15. The apparatus as defined in claim 11, wherein said temperature setting means is activated by random and non-repeating operator input commands.

16. A process for automatically altering space temperature of an inhabited space operatively connected to heating and/or cooling means, said process comprising:
    activating an initial comfort temperature setting by a random and non-repeating operator command;
    continually sensing said space temperature and providing an output functionally related thereto for activating said heating and/or cooling means to obtain said space temperature at approximately said initial comfort temperature setting;
    thereafter automatically altering said initial comfort temperature setting as a function of time and in an energy conserving direction during a first period of time having a duration of at least several hours while activating said heating and/or cooling means to maintain said space temperature at approximately said altered temperature setting;
    thereafter repeatedly reactivating said same or another desired comfort temperature setting by additional random and non-repeating operator input commands;
    thereafter automatically altering said same or another comfort temperature setting as a function of time and in an energy conserving direction during additional periods of time each having the duration of at least several hours while activating said heating and/or said cooling means to maintain said space temperature at approximately said altered same or another comfort temperature setting; and
    automatically prohibiting alteration of said same or another comfort temperature setting beyond a desired final comfort temperature setting.

17. A process as defined in claim 16, wherein said first period of time is selectively adjustable by occupants within said building.

18. A process as defined in claim 17, wherein said space temperature is maintained at approximately said initial comfort temperature setting for a time period exceeding one-half hour.

19. A process as defined in claim 18, wherein said time period is selectively adjustable by occupants within said building.

20. A process as defined in claim 16, wherein said output is functionally related to dry bulb temperature, ambient mean temperature, and air velocity.

* * * * *